United States Patent
Han

(10) Patent No.: US 8,448,648 B2
(45) Date of Patent: May 28, 2013

(54) ARTIFICIAL NAIL AND METHOD OF FORMING SAME

(75) Inventor: Kyu Sang Han, Port Washington, NY (US)

(73) Assignee: Kiss Nail Products, Inc., Port Washington, NY (US)

( * ) Notice: Subject to any disclaimer, the term of this patent is extended or adjusted under 35 U.S.C. 154(b) by 195 days.

(21) Appl. No.: 12/924,589

(22) Filed: Sep. 30, 2010

(65) Prior Publication Data

US 2011/0030711 A1 Feb. 10, 2011

Related U.S. Application Data

(63) Continuation-in-part of application No. 11/894,486, filed on Aug. 21, 2007, which is a continuation of application No. 11/473,251, filed on Jun. 22, 2006, (Continued)

(51) Int. Cl.
*A45D 29/00* (2006.01)
*A45D 7/00* (2006.01)

(52) U.S. Cl.
USPC .............................................. 132/73; 132/200

(58) Field of Classification Search
USPC ..................... 132/73, 200; 264/161, 246, 245
See application file for complete search history.

(56) References Cited

U.S. PATENT DOCUMENTS 1,135,382 A 4/1915 Kindred
2,199,207 A 4/1940 Nolan (Continued)

FOREIGN PATENT DOCUMENTS

EP 0 167 329 1/1986
EP 1 415 567 5/2004

(Continued)

OTHER PUBLICATIONS

*Rapid Injection Molding Journal*, Winter 2005, © 2005, The Protomold Company, Inc., 1757, Halgren Road, Maple Plain, MN 55359.

(Continued)

*Primary Examiner* — Robyn Doan
(74) *Attorney, Agent, or Firm* — The Farrell Law Firm, P.C.

(57) ABSTRACT

An injection molded artificial nail is formed by forming a first section using a runner system method, forming a second section using a runner system method and forming a third section by a hot tip gate process. The second and third sections are disposed under the first section. The second section has a second section end and the third section has a third section end adjoining the second section end. The first section forms a top surface of the artificial nail extending from a front distal tip of the artificial nail to a back proximal end of the artificial nail and completely covers the second section and the third section.

15 Claims, 8 Drawing Sheets

Related U.S. Application Data now Pat. No. 7,677,257, which is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/473,251 is a continuation-in-part of application No. 10/641,986, filed on Aug. 15, 2003, now abandoned, which is a continuation-in-part of application No. 10/348,178, filed on Jan. 22, 2003, now Pat. No. 7,150,281, and a continuation-in-part of application No. 10/281,500, filed on Oct. 28, 2002, now abandoned, said application No. 11/473,251 is a continuation-in-part of application No. 11/041,182, filed on Jan. 20, 2005, now Pat. No. 7,337,783, which is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/041,182 is a continuation-in-part of application No. 10/641,986, filed on Aug. 15, 2003, now abandoned, said application No. 11/894,486 is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/894,486 is a continuation-in-part of application No. 10/641,986, filed on Aug. 15, 2003, now abandoned, which is a continuation-in-part of application No. 10/281,500, filed on Oct. 28, 2002, now abandoned, which is a continuation-in-part of application No. 10/348,718, filed on Jan. 22, 2003, now Pat. No. 7,150,281, said application No. 11/894,486 is a continuation-in-part of application No. 10/281,500, filed on Oct. 28, 2002, now abandoned, which is a continuation-in-part of application No. 11/041,182, filed on Jan. 20, 2005, now Pat. No. 7,337,783, which is a continuation-in-part of application No. 10/348,718, filed on Jan. 22, 2003, now Pat. No. 7,150,281, and a continuation-in-part of application No. 10/641,986, filed on Aug. 15, 2003, now abandoned, application No. 12/924,589, which is a continuation-in-part of application No. 11/894,487, filed on Aug. 21, 2007, now abandoned, which is a continuation-in-part of application No. 11/473,251, filed on Jun. 22, 2006, now Pat. No. 7,677,257, which is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/894,487 is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/894,487 is a continuation-in-part of application No. 10/641,986, filed on Aug. 15, 2003, now abandoned, which is a continuation-in-part of application No. 10/348,718, filed on Jan. 22, 2003, now Pat. No. 7,150,281, and a continuation-in-part of application No. 10/281,500, filed on Oct. 28, 2002, now abandoned, said application No. 11/894,487 is a continuation-in-part of application No. 11/041,182, filed on Jan. 20, 2005, now Pat. No. 7,337,783, which is a continuation-in-part of application No. 10/348,718, filed on Jan. 22, 2003, now Pat. No. 7,150,281, and a continuation-in-part of application No. 10/641,986, filed on Aug. 15, 2003, now abandoned, application No. 12/924,589, which is a continuation-in-part of application No. 11/894,491, filed on Aug. 21, 2007, now abandoned, which is a continuation of application No. 11/473,251, filed on Jun. 22, 2006, now Pat. No. 7,677,257, which is a continuation of application No. 10/348,718, filed on Jan. 22, 2003, now Pat. No. 7,150,281, which is a continuation-in-part of application No. 10/281,500, filed on Oct. 28, 2002, now abandoned, said application No. 11/894,491 is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/894,491 is a continuation-in-part of application No. 10/641,986, filed on Aug. 15, 2003, now abandoned, which is a continuation-in-part of application No. 10/348,718, filed on Jan. 22, 2003, now Pat. No. 7,150,281, and a continuation-in-part of application No. 10/281,500, filed on Oct. 28, 2002, now abandoned, said application No. 11/894,491 is a continuation-in-part of application No. 11/041,182, filed on Jan. 20, 2005, now Pat. No. 7,337,783, which is a continuation-in-part of application No. 10/348,718, filed on Jan. 22, 2003, now Pat. No. 7,150,281, and a continuation-in-part of application No. 10/641,986, filed on Aug. 15, 2003, now abandoned, application No. 12/924,589, which is a continuation-in-part of application No. 11/894,492, filed on Aug. 21, 2007, now abandoned, which is a continuation-in-part of application No. 11/473,251, filed on Jun. 22, 2006, now Pat. No. 7,677,257, which is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/894,492 is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 11/894,492 is a continuation-in-part of application No. 10/641,986, filed on Aug. 15, 2003, now abandoned, which is a continuation-in-part of application No. 10/348,718, filed on Jan. 22, 2003, now Pat. No. 7,150,281, and a continuation-in-part of application No. 10/281,500, filed on Oct. 28, 2002, now abandoned, said application No. 11/894,492 is a continuation-in-part of application No. 11/041,182, filed on Jan. 20, 2005, now Pat. No. 7,337,783, which is a continuation-in-part of application No. 10/348,718, filed on Jan. 22, 2003, now Pat. No. 7,150,281, and a continuation-in-part of application No. 10/641,986, filed on Aug. 15, 2003, now abandoned, application No. 12/924,589, which is a continuation-in-part of application No. 12/157,745, filed on Jun. 12, 2008, now abandoned, which is a continuation of application No. 11/473,251, filed on Jun. 22, 2006, now Pat. No. 7,677,257, which is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 10/641,986 is a continuation-in-part of application No. 10/348,718, filed on Jan. 22, 2003, now Pat. No. 7,150,281, which is a continuation-in-part of application No. 10/281,500, filed on Oct. 28, 2002, now abandoned, said application No. 10/641,986 is a continuation-in-part of application No. 10/348,718, filed on Jan. 22, 2003, now Pat. No. 7,150,281, and a continuation-in-part of application No.

10/281,500, filed on Oct. 28, 2002, now abandoned, said application No. 11/041,182 is a continuation-in-part of application No. 10/641,986, filed on Aug. 15, 2003, now abandoned.

(56) References Cited

U.S. PATENT DOCUMENTS

| | | | |
|---|---|---|---|
| 2,234,657 A | 3/1941 | Smaldone |
| 2,239,040 A | 4/1941 | Holmes |
| 2,607,356 A | 8/1952 | Lewis |
| 2,746,460 A | 5/1956 | Jellinek |
| 2,931,110 A | 4/1960 | Pietrocola |
| 3,502,088 A | 3/1970 | Jarby |
| 4,034,769 A | 7/1977 | Nishimura |
| 4,041,031 A | 8/1977 | Heasman |
| 4,222,399 A | 9/1980 | Ionescu |
| 4,511,608 A | 4/1985 | Ferraro |
| 4,577,648 A | 3/1986 | Dinerstein et al. |
| 4,632,134 A | 12/1986 | Reid |
| 4,671,305 A | 6/1987 | Mann |
| 4,745,934 A | 5/1988 | Mast et al. |
| 4,751,935 A | 6/1988 | Mast et al. |
| 4,767,648 A | 8/1988 | Hokama et al. |
| 4,824,702 A | 4/1989 | Straub |
| 4,860,774 A | 8/1989 | Becker |
| 4,876,121 A | 10/1989 | Cohen |
| 4,884,680 A | 12/1989 | Israel et al. |
| 4,920,991 A | 5/1990 | Shibahashi et al. |
| 4,943,462 A | 7/1990 | Komerska et al. |
| 5,044,384 A | 9/1991 | Hokama et al. |
| 5,150,726 A | 9/1992 | Rucker |
| 5,415,903 A | 5/1995 | Hoffman et al. |
| 5,501,594 A | 3/1996 | Glozer et al. |
| 5,638,835 A | 6/1997 | Franz et al. |
| 5,638,837 A | 6/1997 | Juhl et al. |
| 5,645,090 A | 7/1997 | Juhl et al. |
| 5,699,813 A | 12/1997 | Carroll |
| 5,782,248 A | 7/1998 | Chang |
| 5,860,429 A | 1/1999 | Chang |
| 5,901,714 A | 5/1999 | Benkart |
| 5,908,035 A | 6/1999 | Carroll et al. |
| 5,927,293 A | 7/1999 | Halpern |
| 5,944,027 A | 8/1999 | Chang |
| 5,964,977 A | 10/1999 | Sirdesai et al. |
| 6,042,679 A | 3/2000 | Holt et al. |
| 6,196,234 B1 | 3/2001 | Gifford |
| 6,303,140 B1 | 10/2001 | Dever et al. |
| 6,328,039 B1 | 12/2001 | Chang |
| 6,354,304 B1 | 3/2002 | Chang |
| 6,382,217 B2 | 5/2002 | Coker et al. |
| 6,394,100 B1 | 5/2002 | Chang |
| 6,631,723 B1 | 10/2003 | Mullin |
| 6,641,769 B1 | 11/2003 | Huntimer |
| 6,892,736 B2 | 5/2005 | Chang et al. |
| 7,150,281 B2 | 12/2006 | Han |
| 7,337,783 B2 | 3/2008 | Han |
| 7,677,257 B2 | 3/2010 | Han |
| 2005/0022834 A1 | 2/2005 | Hwang |
| 2007/0051384 A1 | 3/2007 | Fracassi et al. |

FOREIGN PATENT DOCUMENTS

| | | |
|---|---|---|
| EP | 1 454 555 | 9/2004 |
| GB | 2 352 628 | 2/2001 |
| JP | 60-232108 | 11/1985 |
| JP | 5-56007 | 7/1993 |
| JP | 9-201223 | 8/1997 |
| JP | 10-215946 | 8/1998 |
| JP | 2001-505105 | 4/2001 |
| KR | 130038 | 11/1997 |
| KR | 20-1999-0020103 | 6/1999 |
| KR | 2004 0026282 | 3/2004 |
| KR | 1020040059956 | 7/2004 |
| KR | 1020080072601 | 8/2008 |
| KR | 100880002 | 1/2009 |
| KR | 1020090106978 | 10/2009 |
| WO | WO 98/21999 | 5/1998 |

OTHER PUBLICATIONS

Partial European Search Report for EP 07 10 6923 (Oct. 17, 2007) (enclosed).

Extended European Search for EP 07 10 6923 (Nov. 28, 2007) (enclosed).

ARTIFICIAL NAIL AND METHOD OF FORMING SAME

CROSS REFERENCE TO RELATED APPLICATIONS

This application is a continuation-in-part of U.S. application Ser. No. 11/894,486, filed Aug. 21, 2007, which is a continuation of U.S. application Ser. No. 11/473,251, filed Jun. 22, 2006, now U.S. Pat. No. 7,677,257, which is a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/473,251, filed Jun. 22, 2006, now U.S. Pat. No. 7,677,257, is also a continuation-in-part of U.S. application Ser. No. 10/641,986 filed Aug. 15, 2003, now abandoned, which is a continuation-in-part of U.S. application Ser. No. 10/348,718 filed Jan. 22, 2003, now U.S. Pat. No. 7,150,281 and U.S. application Ser. No. 10/281,500 filed Oct. 28, 2002, now abandoned.

U.S. application Ser. No. 11/473,251, filed Jun. 22, 2006, now U.S. Pat. No. 7,677,257, is also a continuation-in-part of U.S. application Ser. No. 11/041,182 filed Jan. 20, 2005, now U.S. Pat. No. 7,337,783 which is a continuation-in-part of U.S. application Ser. No. 10/348,718 filed Jan. 22, 2003, now U.S. Pat. No. 7,150,281 and U.S. application Ser. No. 10/641,986 filed Aug. 15, 2003, now abandoned.

U.S. application Ser. No. 11/894,486, filed Aug. 21, 2007, is also a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,486, filed Aug. 21, 2007, is also a continuation-in-part of U.S. application Ser. No. 10/641,986 filed Aug. 15, 2003, now abandoned, which is a continuation-in-part of U.S. application Ser. No. 10/348,718 filed Jan. 22, 2003, now U.S. Pat. No. 7,150,281 and U.S. application Ser. No. 10/281,500 filed Oct. 28, 2002, now abandoned.

U.S. application Ser. No. 11/894,486, filed Aug. 21, 2007, is also a continuation-in-part of U.S. application Ser. No. 11/041,182 filed Jan. 20, 2005, now U.S. Pat. No. 7,337,783 which is a continuation-in-part of U.S. application Ser. No. 10/348,718 filed Jan. 22, 2003, now U.S. Pat. No. 7,150,281 and U.S. application Ser. No. 10/641,986 filed Aug. 15, 2003, now abandoned.

This application is also a continuation-in-part of U.S. application Ser. No. 11/894,487, filed Aug. 21, 2007, which is a continuation of U.S. application Ser. No. 11/473,251, filed Jun. 22, 2006, now U.S. Pat. No. 7,677,257, which is a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,487, filed Aug. 21, 2007, is also a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,487, filed Aug. 21, 2007, is also a continuation-in-part of U.S. application Ser. No. 10/641,986 filed Aug. 15, 2003, now abandoned, which is a continuation-in-part of U.S. application Ser. No. 10/348,718 filed Jan. 22, 2003, now U.S. Pat. No. 7,150,281 and U.S. application Ser. No. 10/281,500 filed Oct. 28, 2002, now abandoned.

U.S. application Ser. No. 11/894,487, filed Aug. 21, 2007, is also a continuation-in-part of U.S. application Ser. No. 11/041,182 filed Jan. 20, 2005, now U.S. Pat. No. 7,337,783 which is a continuation-in-part of U.S. application Ser. No. 10/348,718 filed Jan. 22, 2003, now U.S. Pat. No. 7,150,281 and U.S. application Ser. No. 10/641,986 filed Aug. 15, 2003, now abandoned.

This application is also a continuation-in-part of U.S. application Ser. No. 11/894,491, filed Aug. 21, 2007, which is a continuation of U.S. application Ser. No. 11/473,251, filed Jun. 22, 2006, now U.S. Pat. No. 7,677,257, which is a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,491, filed Aug. 21, 2007, is also a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,491, filed Aug. 21, 2007, is also a continuation-in-part of U.S. application Ser. No. 10/641,986 filed Aug. 15, 2003, now abandoned, which is a continuation-in-part of U.S. application Ser. No. 10/348,718 filed Jan. 22, 2003, now U.S. Pat. No. 7,150,281 and U.S. application Ser. No. 10/281,500 filed Oct. 28, 2002, now abandoned.

U.S. application Ser. No. 11/894,491, filed Aug. 21, 2007, is also a continuation-in-part of U.S. application Ser. No. 11/041,182 filed Jan. 20, 2005, now U.S. Pat. No. 7,337,783 which is a continuation-in-part of U.S. application Ser. No. 10/348,718 filed Jan. 22, 2003, now U.S. Pat. No. 7,150,281 and U.S. application Ser. No. 10/641,986 filed Aug. 15, 2003, now abandoned.

This application is also a continuation-in-part of U.S. application Ser. No. 11/894,492, filed Aug. 21, 2007, which is a continuation of U.S. application Ser. No. 11/473,251, filed Jun. 22, 2006, now U.S. Pat. No. 7,677,257, which is a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,492, filed Aug. 21, 2007, is also a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 11/894,492, filed Aug. 21, 2007, is also a continuation-in-part of U.S. application Ser. No. 10/641,986 filed Aug. 15, 2003, now abandoned, which is a continuation-in-part of U.S. application Ser. No. 10/348,718 filed Jan. 22, 2003, now U.S. Pat. No. 7,150,281 and U.S. application Ser. No. 10/281,500 filed Oct. 28, 2002, now abandoned.

U.S. application Ser. No. 11/894,492, filed Aug. 21, 2007, is also a continuation-in-part of U.S. application Ser. No. 11/041,182 filed Jan. 20, 2005, now U.S. Pat. No. 7,337,783 which is a continuation-in-part of U.S. application Ser. No. 10/348,718 filed Jan. 22, 2003, now U.S. Pat. No. 7,150,281 and U.S. application Ser. No. 10/641,986 filed Aug. 15, 2003, now abandoned.

This application is also a continuation-in-part of U.S. application Ser. No. 12/157,745, filed Jun. 12, 2008, which is a continuation of U.S. application Ser. No. 11/473,251, filed Jun. 22, 2006, now U.S. Pat. No. 7,677,257, which is a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 12/157,745, filed Jun. 12, 2008, is also a continuation-in-part of U.S. application Ser. No. 10/348,718 filed Jan. 22, 2003, now U.S. Pat. No. 7,150,281, which is a continuation-in-part of U.S. application Ser. No. 10/281,500 filed Oct. 28, 2002, now abandoned.

U.S. application Ser. No. 12/157,745, filed Jun. 12, 2008, is also a continuation-in-part of U.S. application Ser. No. 10/641,986 filed Aug. 15, 2003, now abandoned, which is a continuation-in-part of U.S. application Ser. No. 10/348,718 filed Jan. 22, 2003, now U.S. Pat. No. 7,150,281 and U.S. application Ser. No. 10/281,500 filed Oct. 28, 2002, now abandoned.

U.S. application Ser. No. 12/157,745, filed Jun. 12, 2008, is also a continuation-in-part of U.S. application Ser. No. 11/041,182 filed Jan. 20, 2005, now U.S. Pat. No. 7,337,783 which is a continuation-in-part of U.S. application Ser. No. 10/348,718 filed Jan. 22, 2003, now U.S. Pat. No. 7,150,281 and U.S. application Ser. No. 10/641,986 filed Aug. 15, 2003, now abandoned.

BACKGROUND OF THE INVENTION

1. Field of the Invention

The present invention relates to artificial nails and methods of forming artificial nails. More particularly, the present invention relates to methods for forming artificial nails by injection molding and artificial nails formed according to such methods.

2. The Prior Art

It is known in the art of adorning the hands or feet to provide ornamental nail accessories made from thin, molded plastic members manufactured generally in the shape of a fingernail or toenail. The prior art contains many patents directed to artificial fingernails or other natural fingernail coverings and methods of applying them using various forms of adhesives. See, e.g. U.S. Pat. No. 4,632,134 to Reid; U.S. Pat. No. 4,671,305 to Mann; U.S. Pat. Nos. 4,745,934 and 4,751,935 to Mast et al.; U.S. Pat. No. 4,767,648 to Hokama et al.; U.S. Pat. No. 4,943,462 to Komerska et al.; U.S. Pat. No. 5,638,835 to Franz et al.; U.S. Pat. No. 5,699,813 to Carroll; and U.S. Pat. No. 6,394,100 to Chang.

Artificial nails are typically made of acrylonitrile-butadiene-styrene (ABS) plastic. ABS plastic is useful because it bonds with nail glue and is readily dissolved by acetone which facilitates nail removal. However, ABS plastic cracks easily and is relatively inflexible which prevents the artificial nail from conforming to a particular user. As a result, artificial nails are made in a variety of sizes. However, nail shapes are different, and it is impractical to make nails to accommodate the various shapes for each customer. Instead, artificial fingernails are typically sold in standard sets by size and length, but these sets cannot precisely fit all people.

Another drawback with known artificial nails is that their appearance is usually readily distinguishable from natural nails. Generally, the better the artificial nail fits at the cuticle area, the more the artificial nail will resemble a natural nail. Achieving this fit with artificial nails, however, is difficult and often requires considerable skill in shaping and filing the artificial nail.

To address the problem of making an artificial fingernail accommodate a specific user's hand, U.S. Pat. No. 6,196,234 to Gifford and U.S. Pat. No. 6,382,217 to Coker et al. make a mold from the user's hand with which to construct a custom-made artificial fingernail. These processes are complicated, and there is still a need for an artificial fingernail that is more universally conformable to varying finger sizes and shapes.

Artificial nails may be injection molded using known methods wherein each artificial nail is formed as a single section and from a single material type. Artificial nails produced by known injection molding processes may include vestiges or protrusions disposed at a location where the material used to form the artificial nail enters a mold cavity defining the shape and dimensions of the artificial nail. Such vestiges may detract from or interfere with the fit of the artificial nail, particularly if the vestige is disposed on a portion of the artificial nail to be positioned adjacent a wearer's cuticle area. The vestiges may also form air pockets that prevent good sealing between the protrusion and an adjacent surface. Accordingly, a need exists for an artificial nail and a method for producing an artificial nail having an improved fit, particularly at a wearer's cuticle area.

Artificial nails, like natural nails, are often decorated by applying nail polish to one or more portions of the nail. An artificial nail that can be produced with portions having different colors in a simple and economical way would therefore be useful.

It is also known to apply nail polish to human nails in a style known as a French manicure or French tip using fingernail masks or guides to assist in applying the nail polish. See, e.g., U.S. Pat. No. 2,234,657 to Smaldone; U.S. Pat. No. 2,239,040 to Holmes; U.S. Pat. No. 4,577,648 to Dinerstein et al; U.S. Pat. No. 5,044,384 to Hokama et al; U.S. Pat. No. 5,150,726 to Rucker; U.S. Pat. Nos. 5,638,837 and 5,645,090 to Juhl et al; U.S. Pat. No. 5,782,248 to Chang; and U.S. Pat. No. 5,901,714 to Benkart.

As discussed, for example, in U.S. Pat. No. 5,645,090 to Juhl et al, a French manicure generally involves applying a white or off-white polish in a uniform line at the tip of the nail while not applying such polish to remainder of the nail, i.e. that portion extending from the tip of the nail to the cuticle of the nail. Several methods of obtaining a French manicure are discussed in the patent, including employing a highly skilled manicurist, which is difficult, time consuming and expensive.

It is also known to provide a composite artificial fingernails having a "French manicure" look. See U.S. Pat. No. 5,908,035 to Carroll et al. In a known method, color may be applied to a portion of an artificial nail in a two-step process after the artificial nail is formed. In a first step, the color is applied to a top surface at the tip of the artificial nail, for example by pressing a pad having a colored solution against the top surface of the nail. In a second step, the thin layer of colored material is sealed, for example by spraying the artificial nail with a sealing agent.

There are several drawbacks associated with existing techniques for applying a color to an artificial nail or a portion thereof. In particular, in the known methods the color comprises a thin layer applied only on a top surface of the artificial nail. This thin colored layer may be easily scratched, chipped or rubbed off, thereby revealing the underlying color of the artificial nail. Moreover, the thin colored layer according to existing techniques is susceptible to peeling, particularly when the artificial nail is cut to size by severing a portion of the tip of artificial nail.

In the manufacture of artificial nails by injection molding, the process of printing the artificial nails may be followed by the application of an ultra-violet (UV) topcoat and then packaging and quality control. This UV coating process adds substantial cost to the production process and can be hazardous to the environment. In particular, the UV coating process may require the use of long tunnel-type processing equipment and may generate potentially hazardous fumes.

Thus, although a number of methods for providing various colors to artificial nails or portions thereof are known, including providing color to a portion of an artificial nail in the style of a French manicure, there is still a need for an artificial nail and a method for forming an artificial nail having various colors, wherein a colored portion of the artificial nail is not prone to damage by scratching, chipping, rubbing and/or peeling. Moreover, a need exists for a method for producing an artificial nail having different colors in a simple and economical way. Furthermore, a need exists for an artificial nail and a method for forming an artificial nail having a top layer extending from the front distal tip to the back proximal portion of the artificial nail, wherein the top layer eliminates the need for the costly and potentially environmentally damaging process of UV coating. In particular, a need exists for an artificial nail and a method for forming an artificial nail wherein such top layer may be a clear, scratch-resistant layer formed by injection molding a thin layer of a polymeric material.

SUMMARY OF THE INVENTION

An artificial nail and a method for forming an artificial nail by injection molding are provided. In one aspect, a method for forming an artificial nail includes the steps of forming a first section and forming a second section. The first section and second section are adjacent to one another. One of the first section and the second section defines a front distal tip of the artificial nail and is formed using a runner system method. Another of the first section and the second section is formed using a hot tip gate process.

In another aspect, a method for forming an artificial nail includes the steps of forming a first section, forming a second section, and forming a third section. The first section, second section and third sections are adjacent to one another. One of the first section, second section and third section defines a front distal tip of the artificial nail and is formed using a runner system method. A remaining two sections of the first section, second section and third section are formed using a hot tip gate process.

In another aspect, a method for forming an artificial nail includes the steps of forming a first section and forming a second section. The first section and the second section are adjacent to one another. One of the first section and second section defines a front distal tip of the artificial nail and is formed by injecting a quantity of heated material under pressure from a nozzle into a sprue, through a runner and through a cavity gate into a mold cavity. Another of the first section and second section is formed by injecting another quantity of heated material under pressure from a heated nozzle through another cavity gate into the mold cavity.

In another aspect, a method for forming an artificial nail includes the steps of forming a first section, forming a second section and forming a third section. The first section, second section and third section are adjacent to one another. One of the first section, second section and third section defines a front distal tip of the artificial nail and is formed by injecting a quantity of heated material under pressure from a nozzle into a sprue, through a runner and through a cavity gate into a mold cavity. A remaining two sections of the first section, second section and third section are formed by injecting respective quantities of heated material from respective heated nozzles through respective other cavity gates into the mold cavity.

In another aspect, an artificial nail includes a first section and a second section. The first section and the second section are adjacent to one another. One of the first section and second section defines a front distal tip of the artificial nail and is formed by a runner system injection molding process. Another of the first section and second section is formed by a hot tip gate injection molding process.

In a further aspect, the artificial nail is a nail extension including a polymeric body having first and second sections. The first section has a stepped upper surface which forms a receiving area in a portion of the upper surface. The second section of the polymeric body is disposed in the receiving area. The first section is made of a first translucent polymeric material and has a back proximal part and a front distal part. The back proximal part is adapted to be disposed on an upper surface of a natural nail. The front distal part has an end adapted to abut against an end of the natural nail. The second section is made of a second opaque polymeric material disposed above the front distal part and a portion of the back proximal part.

In another aspect, an artificial nail includes a first section, a second section and a third section. The first section, second section and third section are adjacent to one another. One of the first section, the second section and the third section defines a front distal tip of the artificial nail and is formed by a runner system injection molding process. A remaining two sections of the first section, second section and third section are formed by a hot tip gate injection molding process.

In a further aspect, a method for forming an artificial nail by injection molding includes the steps of forming a first section using a runner system method and forming a second section using a runner system method. The second section is disposed under the first section and comprises a second section end. The method further includes the step of forming a third section using a hot tip gate process. The third section is disposed under the first section and comprises a third section end adjoining the second section end. The first section forms a top surface of the artificial nail extending from a front distal tip of the artificial nail to a back proximal end of the artificial nail and the first section completely covers the second section and the third section. The second section end is distal the front distal tip of the artificial nail and the second section extends from the front distal tip of the artificial nail to the second section end. The third section extends from the back proximal end of the artificial nail to the third section end.

In a further aspect, a method for forming an artificial nail by injection molding includes the steps of forming a first section by injecting a first quantity of heated material under pressure from a first nozzle into a first sprue, through a first runner and through a first cavity gate into a first mold cavity and forming a second section by injecting a second quantity of heated material under pressure from a second nozzle into a second sprue, through a second runner and through a second cavity gate into a second mold cavity. The second section is disposed under the first section and comprises a second section end. The method further includes the step of forming a third section by injecting a third quantity of heated material under pressure from a heated nozzle through a third cavity gate into a third mold cavity. The third section is disposed under the first section and comprises a third section end adjoining the second section end. The first section forms a top surface of the artificial nail extending from a front distal tip of the artificial nail to a back proximal end of the artificial nail and the first section completely covers the second section and the third section. The second section end is distal the front distal tip of the artificial nail and the second section extends from the front distal tip of the artificial nail to the second section end. The third section extends from the back proximal end of the artificial nail to the third section end.

In a further aspect, an injection molded artificial nail includes a first section formed using a runner system method, a second section formed using a runner system method, and a third section formed using a hot tip gate process. The second section is disposed under the first section and comprises a second section end. The third section is disposed under the first section and comprises a third section end adjoining the second section end. The first section forms a top surface of the artificial nail extending from a front distal tip of the artificial nail to a back proximal end of the artificial nail and the first section completely covers the second section and the third section. The second section end is distal the front distal tip of the artificial nail and the second section extends from the front distal tip of the artificial nail to the second section end. The third section extends from the back proximal end of the artificial nail to the third section end.

In further aspects, the first section may include a hard polymeric body, the second section may include an opaque material and/or the third section may include a deformable material and/or the third section may be adapted to be disposed on an upper surface of a natural nail of a wearer.

An advantage of an artificial nail and a method of forming an artificial nail according to an aspect of the invention is that an artificial nail is provided which has an improved fit at a wearer's cuticle area. A further advantage of an artificial nail and a method for forming an artificial nail according to an aspect of the invention is that an artificial nail having two or more discrete sections is provided, wherein the properties and appearance of each section of the artificial nail may be tailored to the particular requirements associated with that section. A further advantage is that a strong mechanical bond is provided at an interface between adjoining sections.

Another advantage of an artificial nail and a method for forming an artificial nail according to an aspect of the invention is that a simple and economical way for producing an artificial nail having various colors is provided, wherein a colored portion of the artificial nail is not prone to damage by scratching, chipping, rubbing and/or peeling.

A further advantage of an artificial nail and a method for forming an artificial nail according to an aspect of the invention is that an artificial nail having a top layer extending from the front distal tip to the back proximal portion of the artificial nail is provided, wherein the top layer eliminates the need for the costly and potentially environmentally damaging process of UV coating.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
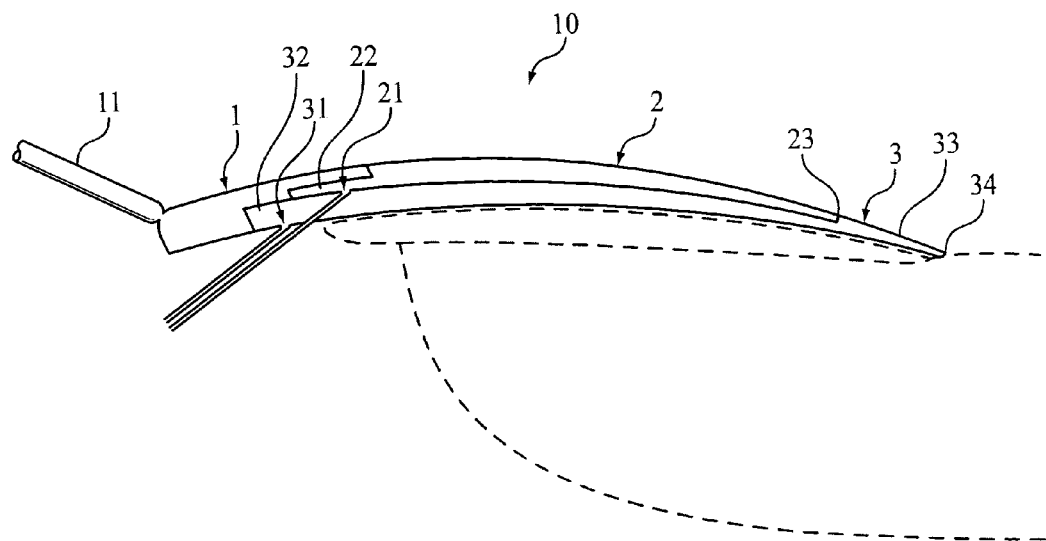
FIG. 1 is a side view of an artificial nail according to a first embodiment of the invention.

Turning now in detail to the drawings, FIG. 1 shows an artificial nail comprising three sections according to an embodiment of the invention. Artificial nail 10 is generally shaped to simulate the appearance of a natural nail.

Figure 4:
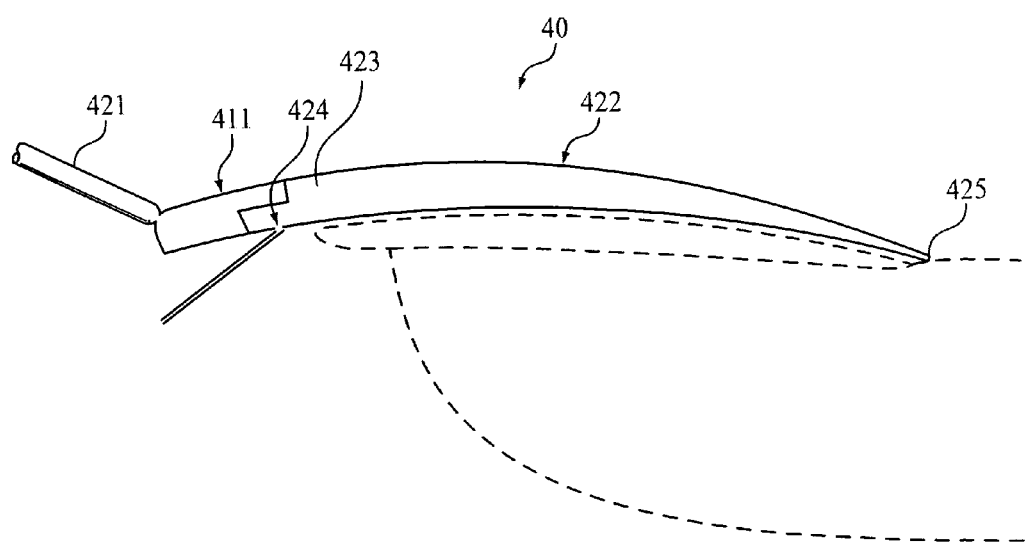
FIG. 4 is a side view of an artificial nail according to a fourth embodiment of the invention.
Figure 5:
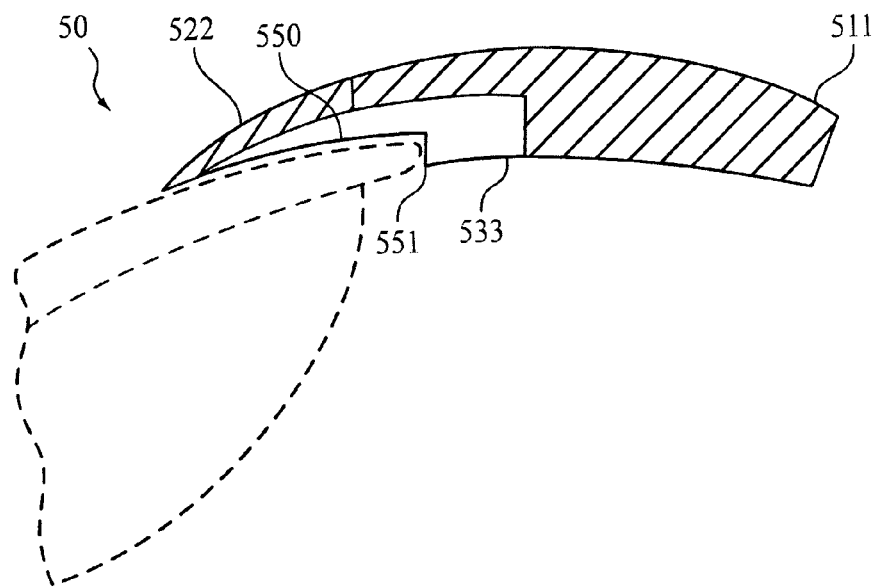
FIG. 5 is a side view of an artificial nail according to a fifth embodiment of the invention, shown as an extension to a wearer's natural nail.
Figure 6:
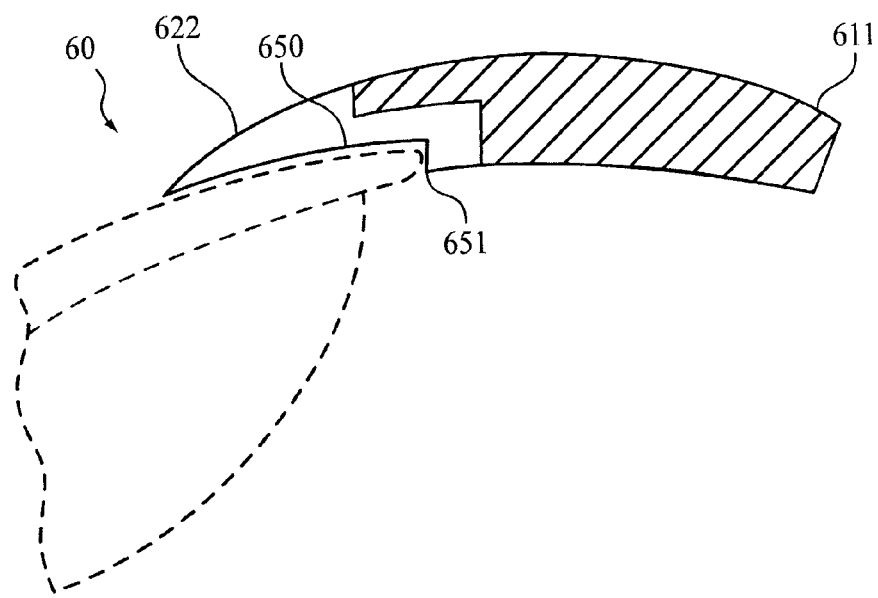
FIG. 6 is a side view of an artificial nail according to a sixth embodiment of the invention, shown as an extension to a wearer's natural nail.

The term "artificial nail" is meant to include both a full-cover nail intended to be applied over the entire surface of a wearer's natural nail (as shown, for example in FIGS. 1-4 and 10-14) and a nail extension intended to be applied to a portion of a wearer's natural nail (as shown, for example in FIGS. 5 and 6). A wearer's natural nail may be a fingernail or a toenail and accordingly artificial nails according to embodiments of the invention may be artificial nails sized and shaped to be applied to a wearer's fingernails or artificial nails sized and shaped to be applied to a wearer's toenails. Artificial nail 10 may be readily manufactured in a number of standard sets by size and length. A user can then select the desired size and length that approximates the user's nail size and shape.

Artificial nail 10 is formed by injection molding. A mold has a mold cavity that defines the dimensions and shape of artificial nail 10. A first section 1, a second section 2 and a third section 3 are formed so that a portion of each section is adjacent to a portion of each of the remaining sections.

In the figures, the respective sections are numbered for ease of reference only, and it is to be understood that the sections of an artificial nail according to an embodiment of the invention may be formed in any sequence or order.

In a preferred method, first section 1 is formed first and defines a front distal tip of artificial nail 10. Artificial nail 10 is preferably sized so that at least a portion of first section 1 extends from a wearer's natural nail. First section 1 may be formed by a runner system method of injection molding. For example, first section 1 may be formed by injecting a quantity of heated material under pressure from a nozzle, into a sprue, through a runner and through a cavity gate or opening in a mold into a mold cavity.

As shown in FIG. 1, the runner system arrangement used to form first section 1 results in the formation of a projection 11 comprising solidified material formed in the channel connecting the cavity gate to the source of material used to form the artificial nail section. Projection 11 may be formed, for example, in the runner connecting a sprue to a cavity gate through which the material used to form first section 1 flows.

Projection 11 accordingly may have the shape and dimensions of the runner and may be referred to as a runner.

As shown, projection or runner 11 is formed integral with the section of the artificial nail formed by a runner system method, for example first section 1. Projection or runner 11 must be removed in a separate processing step before the artificial nail can be used. Preferably, the artificial nail is sold with runner 11 on first section 1 so that runner 1 may be used by the wearer of artificial nail as a handle or applicator to facilitate application of the artificial nail to the wearer's natural nail. Runner 11 may also be provided with a number or other indicia providing size or other information regarding the associated nail. Following application of the artificial nail to the natural nail, the user can simply and easily remove runner 11 from the artificial nail.

After removal of the projection or runner 11, a vestige or protrusion may remain on a portion of the artificial nail section formed by a runner system method. This vestige may detract from or interfere with the fit of the artificial nail, particularly if the vestige is disposed on an edge of the artificial nail to be positioned adjacent a wearer's cuticle area. The vestige may also form an air pocket that prevents good sealing between the protrusion and an adjacent surface.

Accordingly, in a method according to an embodiment of the invention, a section of the artificial nail formed by a runner system method of injection molding preferably comprises a front distal tip of the artificial nail. A runner 11 used to form the front distal tip section of the artificial nail is preferably arranged at an edge of the artificial nail which is not in contact with a wearer's cuticle area or the wearer's natural nail when the artificial nail is applied. In this way, a vestige resulting from forming a section of the artificial nail by a runner system method does not detract from or interfere with the fit of the artificial nail. Thus, a method according to an embodiment of the invention provides an artificial nail with an enhanced fit at the cuticle area, greater wearer comfort and a more natural looking appearance. In addition, an air pocket which prevents good sealing between the artificial nail and a wearer's natural nail cannot form from the protrusion.

As described above, first section 1 may be formed by a runner system method, for example by injecting a quantity of heated material under pressure from a nozzle into a sprue, through a runner and thorough a cavity gate into a mold cavity. The material used to form first section 1 may be a mixture of acrylonitrile-butadiene-styrene (ABS) plastic and a polycarbonate. Additionally, first section 1 may be formed from any plastic-like material commonly employed in the manufacture of artificial nails, such as ABS plastic, nylon, tenite acetate, vinyl acetate, polycarbonates, polyvinyl chloride, etc.

Preferably, first section 1 comprises a hard, polymeric body. Examples of suitable hard materials for first section 1 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UXS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

The section forming a front distal tip of the artificial nail, for example first section 1, is preferably different in color from one or more remaining sections of the artificial nail 10, for example second section 2 and/or third section 3. First section 1 may be translucent, transparent, or opaque.

In a preferred embodiment, first section 1 comprises a white, off-white or near-white color, wherein one or more additional sections of the artificial nail comprise a contrasting or different color thereby providing the appearance of a "french tip" or french manicure.

Additionally, the section forming a front distal tip of the artificial nail, for example first section 1, preferably has a color which is substantially uniform through a thickness of the section. For example, first section 1 may be formed from a substantially homogenous material such that an appearance of first section 1 is substantially the same from a top surface to a bottom surface of the section. In this way, the appearance of a colored portion at the distal tip of the artificial nail will not be diminished by scratching, chipping, rubbing and/or peeling as is the case with existing artificial nails wherein color is applied as a thin layer disposed over the distal tip section.

Moreover, a method of forming an artificial nail having a distal tip with a substantially uniform color through its thickness according to an embodiment of the invention eliminates the steps of coating the artificial nail section with a thin layer of nail polish or other colored solution as well as the additional step of sealing the thin colored layer of the artificial nail with a sealing agent.

Fashioning a front section 1 with a distal portion made from one material that extends entirely from the top to the bottom of the artificial nail is preferable over having the distal portion extend only partially to the bottom of the distal portion of the artificial nail, such as where a separate layer of material is placed underneath the distal portion of first section 1. In this way, the entire distal end of the artificial nail is one color and material so that even if viewed from underneath or from the end and even if scratched, the distal portion of the first section will appear to have one, preferably white, color to better simulate a french manicure.

Accordingly, embodiments of the invention provide a method for forming an artificial nail having various colored sections in a simple and economical way.

As shown in FIG. 1, artificial nail 10 may comprise two additional sections, shown as second section 2 and third section 3. Second section 2 and third section 3 may be formed by a hot tip gate process, such as a micro hot tip gate process, using hot manifolds, one for the material for second section 2 and one for the material for third section 3. For example, each of second section 2 and third section 3 may be formed by injecting a respective heated material from a respective heated nozzle into a respective cavity gate in the mold. Preferably, the gates are small, for example 0.0025 inches (0.0635 mm) in diameter, as the sections being formed are thin walled, for example 0.005 inches (0.127 mm) in thickness.

Use of a hot tip gate process to form second and third sections 2, 3 allows the direct gating on the section, which provides flexibility in the formation of the sections of the artificial nail and better control over the placement of the vestiges formed on the respective section. The hot tip gate process also eliminates the waste as no runner material is formed for those sections.

The hot tip gate process used to form second and third sections 2, 3 may employ a heated nozzle which feeds the material directly into the mold cavity, preferably at an angle generally upward and directed toward the proximal portion of the artificial nail to facilitate material flow into the mold. As shown, second section 2 has a first end 22 adjacent the front distal tip of the artificial nail 10 and a second end 23 distal the front tip of the artificial nail 10. Similarly, third section 3 has a first end 32 adjacent the front distal tip of the artificial nail 10 and a second end 33 distal the front tip of the artificial nail 10.

Respective gates 21, 31 in the mold cavity used to inject the material or materials used to form second section 2 and third section 3 may be positioned at a portion of the respective section other than second end 23, 33. Preferably, the gates used to form the second and third sections of the artificial nail by a hot tip gate process are disposed in a region of the respective section proximate the front distal tip section formed by a runner system method. Gates 21 and 31 may further be positioned at an edge or bottom surface of the respective section 2, 3. The gates should be at a location where the artificial nail will not be in contact with a wearer's natural nail to prevent an air pocket from forming where the vestige or protrusion from the gate is located. Preferably, at least gate 31 from third section 3 is located vertically beneath a portion of front distal tip section 1 so as to ensure that the protrusion will not be in contact with the wearer's natural nail and cannot cause an air pocket to prevent sealing between the natural nail and the artificial nail when the artificial nail is applied.

The hot tip gate injection molding process used to form second section 2 and third section 3 minimizes the gate vestige formed on the respective section. For example, the gate vestige may be 0.005 inches (0.127 mm). This feature contributes to an enhanced fit at the cuticle area, greater wearer comfort and a more natural looking appearance for the artificial nail. In addition, as stated above, by locating the gate used to form at least the third or lowermost section 3 distal of where the third section 3 will be in contact with the wearer's natural nail, the possibility of an air pocket between the artificial nail and the wearer's natural nail caused by the gate vestige is eliminated. Preferably, the gate 21 from the second section 2 is also located distal of where third section 3 will be in contact with the wearer's natural nail and beneath a portion of front distal tip section 1, but this location is less important as the gate vestige will be covered by third section 3 and not in contact with the wearer's natural nail.

The materials used to form second section 2 and third section 3 using a hot tip gate process may be the same or a different material as the material used to form first section 1 using a runner system method of injection molding. Moreover, the materials used to form second section 2 and third section 3 may be the same materials or different materials from each other.

As described above, the respective sections of an artificial nail according to the invention may be formed in any order and the section numbers used herein are for ease of reference only. In a preferred embodiment, first section 1 is formed first using a runner system method, followed sequentially by second section 2 and third section 3, each of which is formed using a hot tip gate process.

In a preferred embodiment, second section 2 forms at least a portion of a top surface of artificial nail 10. The material used to form second section 2 may be a mixture of acrylonitrile-butadiene-styrene (ABS) plastic and a polycarbonate. Additionally, second section 2 may be formed from any plastic-like material commonly employed in the manufacture of artificial nails, such as ABS plastic, nylon, tenite acetate, vinyl acetate, polycarbonates, polyvinyl chloride, etc.

Preferably, second section 2 comprises a hard, polymeric body. Examples of suitable, hard materials for second section 2 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UXS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

Second section 2 and third section 3 may be translucent, transparent, opaque. Second section 2 is preferably different in color from one or more remaining section of the artificial nail 10. For example, second section 2 may comprise a translucent polymeric material which preferably simulates the color of a natural fingernail. The term "translucent" is meant to include both transparent or clear materials and tinted materials that permit materials disposed underneath to be visible there through. Second section 2 may further comprise an opaque material. In a preferred embodiment, second section 2 may be pink in color.

In a preferred embodiment, third section 3 may form at least a portion of a bottom surface of artificial nail 10 adapted to be disposed on an upper surface of a natural nail of a wearer of artificial nail 10. Third section 3 may be generally of uniform thickness, for example 0.8 mm to 1.0 mm, but may decrease in thickness (i.e. taper) at second end 33 to facilitate attachment and blending with a natural nail and to conform to the contour of second section 2.

The material used to form third section 3 may be a mixture of acrylonitrile-butadiene-styrene (ABS) plastic and a polycarbonate. Additionally, third section 3 may be formed from any plastic-like material commonly employed in the manufacture of artificial nails, such as ABS plastic, nylon, tenite acetate, vinyl acetate, polycarbonates, polyvinyl chloride, etc.

Third section 3 may comprise a hard, polymeric body. Examples of suitable hard materials for third section 3 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UXS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

Preferably, however, third section 3 is formed from a soft or deformable material. An advantage of forming third section 3 from a deformable material is that each artificial nail will conform more closely to the user's natural nail when applied thereto. A further advantage of forming third section 3 from a deformable material is that first section 1 and second section 2 may be made from a wide variety of hard substances while also enabling the artificial fingernail to be easily removable by conventional acetone removers. Because the third section 3 comprises a deformable layer that contacts the wearer's nail, materials that do not readily dissolve in acetone may be used for the first and second sections without sacrificing ease of removability.

For example, after selecting an appropriately sized artificial nail 10, the user may apply a selected conventional adhesive, such as an ethylcyanoacrylate-based glue, to the natural nail. Artificial nail 10 is then placed on the natural nail so as to cover substantially all or a portion of the upper nail surface. Pressure is applied by pressing down on artificial nail 10. Such pressure causes third section 3 to compress and conform to the contour of the upper surface of the wearer's natural nail, thereby providing a better fit. If desired, once applied, artificial fingernail 10 may be trimmed and shaped using a nail file.

Exemplary deformable materials used to form third section 3 are thermoplastic elastomers (TPE), thermoplastic polyurethanes (TPU) or mixtures thereof, preferably silicone, silicone derivatives, rubbers, or other materials which will deform under pressure to conform to the contour of a wearer's natural nail. For example, material suitable for forming soft contact lenses such as silicone elastomers, silicone-containing macromers, hydrogels, silicone-containing hydrogels, siloxanes, siloxane macromers, and mixtures thereof may be used to form third section 3.

Examples of suitable soft or deformable materials are Versaflex® OM9-802CL, a thermoplastic elastomer alloy available from GLS Corporation of Arlington Heights, Ill.; TPE40ANS200 (trade name), a thermoplastic elastomer alloy available from Advanced Elastomer Systems; Elastollan® TPU, thermoplastic polyurethane elastomer available from BASF Corporation; Estane TPU (trade name), a thermoplastic polyurethane elastomer available from Noveon, Inc.; and Engage 8407 TPU, a polyolefin elastomer available from Du Pont Dow Elastomers of Wilmington, Del.

The materials for the first, second and third sections 1, 2 and 3 are preferably chosen so as to be compatible and bond with each other chemically so that the sections adhere together and the risk of separation between sections is minimized. The materials should also be chemically resistant to certain products, such as nail polish or adhesives used to apply the artificial nail to a wearer's natural nail. Preferably, first and second section 1, 2 are formed to be rigid, but flexible. Preferably, first section 1 is white in color and made from pure acrylonitrile-butadiene-styrene (ABS). Second section 2 is preferably pink in color and made from a mixture of ABS and thermoplastic polyurethane (TPU). Section 3 is preferably deformable and made from TPU.

In a preferred embodiment, third section 3 may have a back proximal portion which extends beyond the back proximal part of second section 2 and is adapted to conform to a cuticle portion of the wearer's nail and remain deformable when the artificial nail is worn by the wearer, the back proximal portion of the third section 3 forming a portion of a top surface of the artificial nail without being covered by second section 2.

Third section 3 may be translucent, transparent, or opaque. A second end of second section and/or third section 23, 33 may have an upper surface that has been treated to render it opaque by chemical or mechanical etching. The term "opaque" is meant to include frosted surfaces which may permit a small amount of light to pass through. Preferably, this upper surface has a curved "half moon" perimeter to simulate the area of a natural fingernail. Second end 33 of third section 3 preferably tapers to a smaller thickness, for example 0.03 mm to 0.1 mm, at its proximal end to facilitate attachment and blending with a natural nail and to conform to the contour of second section 2. Additionally, second end 33 of third section 3 may comprise a cuticle contact area 34 having a curved edge adapted to contact a cuticle portion of a natural nail.

Adjoining portions of at least one of first section 1, second section 2 and third section 3 and another of first section 1, second section 2 and third section 3 may form a stepped interface. The stepped interface between adjacent sections may comprise a number of substantially horizontal segments and a number of substantially vertical segments arranged at approximately right angles to one another. As shown in FIG. 1, stepped interface may comprise, for example, a two step interface.

An advantage of forming adjoining sections of an artificial nail as a stepped interface is that this structure provides enhanced mechanical strength to the artificial nail. The stepped interface provides a strong mechanical bond between adjacent sections of an artificial nail according to an embodiment of the invention and prevents the sections from separating from one another.

Figure 2:
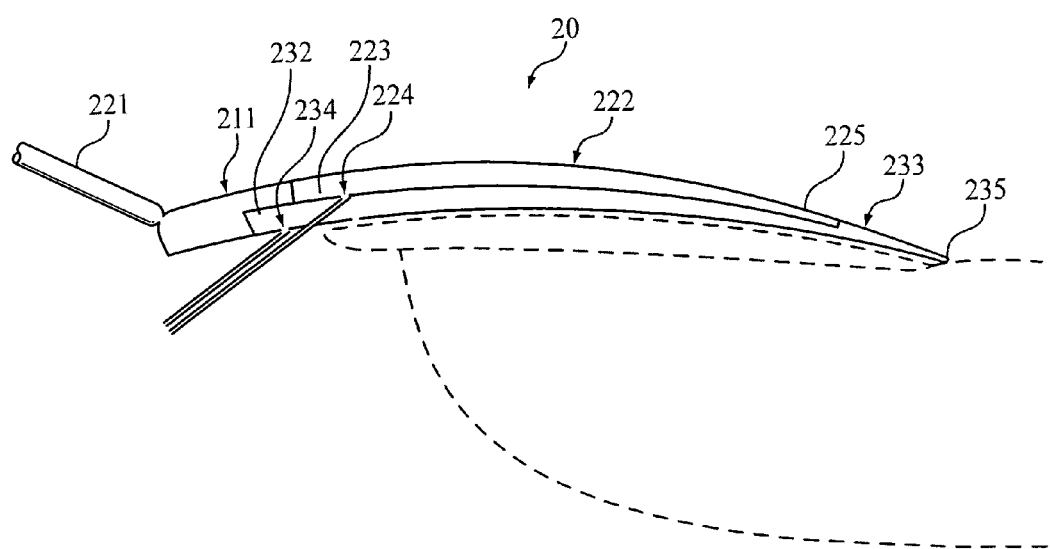
FIG. 2 is a side view of an artificial nail according to a second embodiment of the invention.

FIG. 2 shows an artificial nail comprising three sections according to another embodiment of the invention. As shown, artificial nail 20 may comprise a first section 211 formed by a runner system method as described for the embodiment shown in FIG. 1. As shown, projection or runner 221 is formed integral with the section of the artificial nail formed by a runner system method, for example first section 211. Projection or runner 221 must be removed in a separate processing step before the artificial nail can be used. Preferably, the artificial nail is sold with runner 221 on first section 211 so that runner 221 may be used by the wearer of artificial nail as a handle or applicator to facilitate application of the artificial nail to the wearer's natural nail. Runner 221 may also be provided with a number or other indicia providing size or other information regarding the associated nail. Following application of the artificial nail to the natural nail, the user can simply and easily remove runner 221 from the artificial nail.

After removal of the projection or runner 221, a vestige or protrusion may remain on a portion of the artificial nail section formed by a runner system method. This vestige may detract from or interfere with the fit of the artificial nail, particularly if the vestige is disposed on an edge of the artificial nail to be positioned adjacent a wearer's cuticle area. The vestige may also form an air pocket that prevents good sealing between the protrusion and an adjacent surface.

Accordingly, in a method according to an embodiment of the invention, a section of the artificial nail formed by a runner system method of injection molding preferably comprises a front distal tip of the artificial nail. A runner 221 used to form the front distal tip section of the artificial nail 20 is preferably arranged at an edge of the artificial nail which is not in contact with a wearer's cuticle area or the wearer's natural nail when the artificial nail is applied. In this way, a vestige resulting from forming a section of the artificial nail by a runner system method does not detract from or interfere with the fit of the artificial nail. Thus, a method according to an embodiment of the invention provides an artificial nail with an enhanced fit at the cuticle area, greater wearer comfort and a more natural looking appearance. In addition, an air pocket which prevents good sealing between the artificial nail and a wearer's natural nail cannot form from the protrusion.

Artificial nail 20 may further comprise a second section 222 and a third section 233, each of which are formed by a hot tip gate process as described for the embodiment shown in FIG. 1. Second section 222 and third section 233 may be formed by a hot tip gate process, such as a micro hot tip gate process, using hot manifolds, one for the material for second section 222 and one for the material for third section 233. For example, each of second section 222 and third section 233 may be formed by injecting a respective heated material from a respective heated nozzle into a respective cavity gate in the mold. Preferably, the gates are small, for example 0.0025 inches (0.0635 mm) in diameter, as the sections being formed are thin walled, for example 0.005 inches (0.127 mm) in thickness.

Use of a hot tip gate process to form second and third sections 222, 233 allows the direct gating on the section, which provides flexibility in the formation of the sections of the artificial nail and better control over the placement of the vestiges formed on the respective section. The hot tip gate process also eliminates the waste as no runner material is formed for those sections.

The hot tip gate process used to form second and third sections 222, 233 may employ a heated nozzle which feeds the material directly into the mold cavity, preferably at an angle generally upward and directed toward the proximal portion of the artificial nail to facilitate material flow into the mold. As shown, second section 222 has a first end 223 adjacent the front distal tip of the artificial nail 20 and a second end 225 distal the front tip of the artificial nail 20. Similarly, third section 233 has a first end 232 adjacent the front distal tip of the artificial nail 20 and a second end 235 distal the front tip of the artificial nail 20.

Respective gates 224, 234 in the mold cavity used to inject the material or materials used to form second section 222 and third section 233 may be positioned at a portion of the respective section other than second end 225, 235. Preferably, the gates used to form the second and third sections of the artificial nail by a hot tip gate process are disposed in a region of the respective section proximate the front distal tip section formed by a runner system method. Gates 224, 234 may further be positioned at an edge or bottom surface of the respective section 222, 233. The gates should be at a location where the artificial nail will not be in contact with a wearer's natural nail to prevent an air pocket from forming where the vestige or protrusion from the gate is located. Preferably, at least gate 234 from third section 233 is located vertically beneath a portion of front distal tip section 211 so as to ensure that the protrusion will not be in contact with the wearer's natural nail and cannot cause an air pocket to prevent sealing between the natural nail and the artificial nail when the artificial nail is applied.

The hot tip gate injection molding process used to form second section 222 and third section 233 minimizes the gate vestige formed on the respective section. For example, the gate vestige may be 0.005 inches (0.127 mm). This feature contributes to an enhanced fit at the cuticle area, greater wearer comfort and a more natural looking appearance for the artificial nail. In addition, as stated above, by locating the gate used to form at least the third or lowermost section 233 distal of where the third section 233 will be in contact with the wearer's natural nail, the possibility of an air pocket between the artificial nail and the wearer's natural nail caused by the gate vestige is eliminated. Preferably, the gate 224 from the second section 222 is also located distal of where third section 233 will be in contact with the wearer's natural nail and beneath a portion of front distal tip section 211, but this location is less important as the gate vestige will be covered by third section 233 and not in contact with the wearer's natural nail.

The methods for forming, materials and appearance of the various sections of artificial nail 20 are similar to those described for the embodiment shown in FIG. 1. However, the interface between adjacent portions of first section 211, second section 222 and third section 233 as shown in FIG. 2 comprises a single step interface, wherein second section 222 adjoins first section 211 in a substantially vertical manner.

The materials for the first, second and third sections 211, 222 and 233 are preferably chosen so as to be compatible and bond with each other chemically so that the sections adhere together and the risk of separation between sections is minimized. The materials should also be chemically resistant to certain products, such as nail polish or adhesives used to apply the artificial nail to a wearer's natural nail. Preferably, first and second section 211, 222 are formed to be rigid, but flexible. Preferably, first section 211 is white in color and made from pure acrylonitrile-butadiene-styrene (ABS). Second section 222 is preferably pink in color and made from a mixture of ABS and thermoplastic polyurethane (TPU). Third section 233 is preferably deformable and made from TPU.

Figure 3:
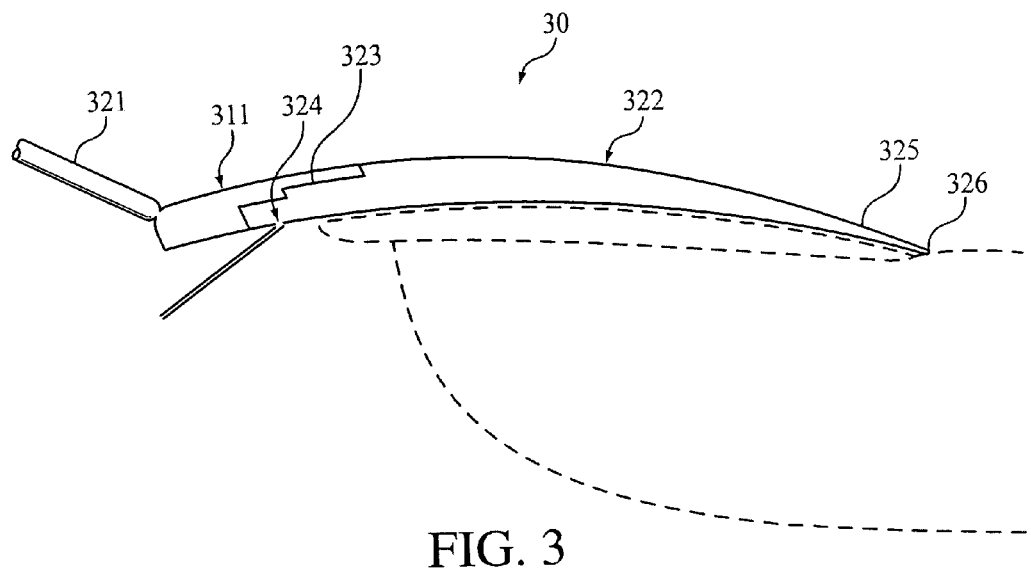
FIG. 3 is a side view of an artificial nail according to a third embodiment of the invention.

FIG. 3 shows an artificial nail comprising two sections according to another embodiment of the invention. Artificial nail 30 is formed by injection molding in a mold having a mold cavity that defines the dimensions and shape of artificial nail 30. A first section 311 and a second section 322 are formed so that a portion of each section is adjacent to a portion of the other section.

In a preferred method, first section 311 is formed first and defines a front distal tip of artificial nail 30. Artificial nail 30 is preferably sized so that at least a portion of first section 311 extends from a wearer's natural nail. First section 311 may be formed by a runner system method of injection molding. For example, first section 311 may be formed by injecting a quantity of heated material under pressure from a nozzle, into a sprue, through a runner and through a cavity gate or opening in a mold into a mold cavity.

As shown in FIG. 3, the runner system arrangement used to form first section 311 results in the formation of a projection 321 comprising solidified material formed in the channel connecting the cavity gate to the source of material used to form the artificial nail section. Projection 321 may be formed, for example, in the runner connecting a sprue to a cavity gate through which the material used to form first section 311 flows. Projection 321 accordingly may have the shape and dimensions of the runner and may be referred to as a runner.

As shown, projection or runner 321 is formed integral with the section of the artificial nail formed by a runner system method, for example first section 311. Projection or runner 321 must be removed in a separate processing step before the artificial nail can be used. Preferably, the artificial nail is sold with runner 321 on first section 311 so that runner 321 may be used by the wearer of artificial nail as a handle or applicator to facilitate application of the artificial nail to the wearer's natural nail. Runner 321 may also be provided with a number or other indicia providing size or other information regarding the associated nail. Following application of the artificial nail to the natural nail, the user can simply and easily remove runner 321 from the artificial nail.

After removal of the projection or runner 321, a vestige or protrusion may remain on a portion of the artificial nail section formed by a runner system method. This vestige may detract from or interfere with the fit of the artificial nail, particularly if the vestige is disposed on an edge of the artificial nail to be positioned adjacent a wearer's cuticle area. The vestige may also form an air pocket that prevents good sealing between the protrusion and an adjacent surface.

Accordingly, in a method according to an embodiment of the invention, a section of the artificial nail 30 formed by a runner system method of injection molding preferably comprises a front distal tip of the artificial nail. A runner 321 used to form the front distal tip section of the artificial nail is preferably arranged at an edge of the artificial nail which is not in contact with a wearer's cuticle area or the wearer's natural nail when the artificial nail is applied. In this way, a vestige resulting from forming a section of the artificial nail by a runner system method does not detract from or interfere with the fit of the artificial nail. Thus, a method according to an embodiment of the invention provides an artificial nail with an enhanced fit at the cuticle area, greater wearer comfort and a more natural looking appearance. In addition, an air pocket which prevents good sealing between the artificial nail and a wearer's natural nail cannot form from the protrusion.

As described above, first section 311 may be formed by a runner system method, for example by injecting a quantity of heated material under pressure from a nozzle into a sprue, through a runner and thorough a cavity gate into a mold cavity. The material used to form first section 311 may be a mixture of acrylonitrile-butadiene-styrene (ABS) plastic and a polycarbonate. Additionally, first section 311 may be formed from any plastic-like material commonly employed in the manufacture of artificial nails, such as ABS plastic, nylon, tenite acetate, vinyl acetate, polycarbonates, polyvinyl chloride, etc.

Preferably, first section 311 comprises a hard, polymeric body. Examples of suitable hard materials for first section 311 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UXS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

First section 311 which forms a front distal tip of the artificial nail, is preferably different in color from second section 322 of artificial nail 30. First section 311 may be translucent, transparent, or opaque.

In a preferred embodiment, first section 311 comprises a white, off-white or near-white color, wherein second section 322 comprises a contrasting or different color thereby providing the appearance of a "french tip" or french manicure.

Additionally, first section 311 preferably has a color which is substantially uniform through a thickness of the section. For example, first section 311 may be formed from a substantially homogenous material such that an appearance of first section 311 is substantially the same from a top surface to a bottom surface of the section. In this way, the appearance of a colored portion at the distal tip of the artificial nail will not be diminished by scratching, chipping, rubbing and/or peeling as is the case with existing artificial nails wherein color is applied as a thin layer disposed over the distal tip section.

Moreover, a method of forming an artificial nail having a distal tip with a substantially uniform color through its thickness according to an embodiment of the invention eliminates the steps of coating the artificial nail section with a thin layer of nail polish or other colored solution as well as the additional step of sealing the thin colored layer of the artificial nail with a sealing agent.

Fashioning a front section 311 with a distal portion made from one material that extends entirely from the top to the bottom of the artificial nail is preferable over having the distal portion extend only partially to the bottom of the distal portion of the artificial nail, such as where a separate layer of material is placed underneath the distal portion of first section 311. In this way, the entire distal end of the artificial nail is one color and material so that even if viewed from underneath or from the end and even if scratched, the distal portion of the first section will appear to have one, preferably white, color to better simulate a french manicure.

Accordingly, embodiments of the invention provide a method for forming an artificial nail having various colored sections in a simple and economical way.

As shown in FIG. 3, artificial nail 30 may comprise at least one additional section, shown as second section 322. Second section 322 may be formed by a hot tip gate process, such as a micro hot tip gate process, using a hot manifold. For example, second section 322 may be formed by injecting a heated material from a heated nozzle into a cavity gate in the mold. Preferably, the gate is small, for example 0.0025 inches (0.0635 mm) in diameter as the section being formed is thin walled, for example 0.005 inches (0.127 mm) in thickness.

Use of a hot tip gate process to form second section 322 provides flexibility in the formation of the section and better control over the placement of a vestige formed on the section. The hot tip gate process also eliminates the waste as no runner material is formed for the section formed by a hot tip gate process.

The hot tip gate process used to form second section 322 may employ a heated nozzle which feeds the material directly into the mold cavity, preferably at an angle generally upward and directed toward the proximal portion of the artificial nail to facilitate material flow into the mold. As shown, second section 322 has a first end 323 adjacent the front distal tip of the artificial nail 30 and a second end 325 distal the front tip of the artificial nail 30.

Gate 324 in the mold cavity used to inject the material or materials used to form second section 322 may be positioned at a portion of second section 322 other than second end 325. Preferably, the gate used to form the second section 322 of the artificial nail by a hot tip gate process is disposed in a region proximate the front distal tip section formed by a runner system method. Gate 324 may further be positioned at an edge or bottom surface of second section 322. Gate 324 should be at a location where the artificial nail will not be in contact with a wearer's natural nail to prevent an air pocket from forming where the vestige or protrusion from the gate is located. Preferably, gate 324 is located vertically beneath a portion of front distal tip section 311 so as to ensure that the protrusion will not be in contact with the wearer's natural nail and cannot cause an air pocket to prevent sealing between the natural nail and the artificial nail when the artificial nail is applied.

The hot tip gate injection molding process used to form second section 322 minimizes the gate vestige formed on the section. For example, the gate vestige may be 0.005 inches (0.127 mm). This feature contributes to an enhanced fit at the cuticle area, greater wearer comfort and a more natural looking appearance for the artificial nail. In addition, as stated above, by locating the gate used to form second section 322 distal of where the section will be in contact with the wearer's natural nail, the possibility of an air pocket between the artificial nail and the wearer's natural nail caused by the gate vestige is eliminated.

The material used to form second section 322 using a hot tip gate process may be the same or a different material as the material used to form first section 311 using a runner system method of injection molding. For example, the material used to form second section 322 may be a mixture of acrylonitrile-butadiene-styrene (ABS) plastic and a polycarbonate. Additionally, second section 322 may be formed from any plastic-like material commonly employed in the manufacture of artificial nails, such as ABS plastic, nylon, tenite acetate, vinyl acetate, polycarbonates, polyvinyl chloride, etc.

Second section 322 may comprise a hard, polymeric body. Examples of suitable hard materials for second section 322 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UKS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

Preferably, however, second section 322 is formed from a soft or deformable material. An advantage of forming second section 322 from a deformable material is that each artificial nail will conform more closely to the user's natural nail when applied thereto. A further advantage of forming second section 322 from a deformable material is that first section 311 may be made from a wide variety of hard substances while also enabling the artificial fingernail to be easily removable by conventional acetone removers. Because the second section 322 comprises a deformable layer that contacts the wearer's nail, materials that do not readily dissolve in acetone may be used for the first section 311 without sacrificing ease of removability.

For example, after selecting an appropriately sized artificial nail 30, the user may apply a selected conventional adhesive, such as an ethylcyanoacrylate-based glue, to the natural nail. Artificial nail 30 is then placed on the natural nail so as to cover substantially all or a portion of the upper nail surface. Pressure is applied by pressing down on artificial nail 30. Such pressure causes second section 322 to compress and conform to the contour of the upper surface of the wearer's natural nail, thereby providing a better fit. If desired, once applied, artificial fingernail 30 may be trimmed and shaped using a nail file.

Exemplary deformable materials used to form second section 322 are thermoplastic elastomers (TPE), thermoplastic polyurethanes (TPU) or mixtures thereof, preferably silicone, silicone derivatives, rubbers, or other materials which will deform under pressure to conform to the contour of a wearer's natural nail. For example, material suitable for forming soft contact lenses such as silicone elastomers, silicone-containing macromers, hydrogels, silicone-containing hydrogels, siloxanes, siloxane macromers, and mixtures thereof may be used to form second section 322.

Examples of suitable soft or deformable materials are Versaflex® OM9-802CL, a thermoplastic elastomer alloy available from GLS Corporation of Arlington Heights, Ill.; TPE40ANS200 (trade name), a thermoplastic elastomer alloy available from Advanced Elastomer Systems; Elastollan® TPU, a thermoplastic polyurethane elastomer available from BASF Corporation; Estane TPU (trade name), a thermoplastic polyurethane elastomer available from Noveon, Inc.; and Engage 8407 TPU, a polyolefin elastomer available from Du Pont Dow Elastomers of Wilmington, Del.

The materials for the first and second sections 311, and 322 are preferably chosen so as to be compatible and bond with each other chemically so that the sections adhere together and the risk of separation between sections is minimized. The materials should also be chemically resistant to certain products, such as nail polish or adhesives used to apply the artificial nail to a wearer's natural nail. Preferably, first section 311 is formed to be rigid, but flexible. Preferably, first section 311 is white in color and made from pure acrylonitrile-butadiene-styrene (ABS). Second section 322 is preferably pink in color and made from a deformable material, for example, TPU.

In a preferred embodiment, second section 322 may have a back proximal portion which extends beyond the back proximal part of first section 311 and is adapted to conform to a cuticle portion of the wearer's nail and remain deformable when the artificial nail is worn by the wearer, the back proximal portion of the second section 322 forming a portion of a top surface of the artificial nail without being covered by first section 311.

Second section 322 may be translucent, transparent, or opaque. For example, second section 322 may comprise a translucent polymeric material which preferably simulates the color of a natural fingernail. The term "translucent" is meant to include both transparent or clear materials and tinted materials that permit materials disposed underneath to be visible there through. Second section 322 may further comprise an opaque material. A second end 325 of second section 322 may have an upper surface that has been treated to render it opaque by chemical or mechanical etching. The term "opaque" is meant to include frosted surfaces which may permit a small amount of light to pass through. Preferably, this upper surface has a curved "half moon" perimeter to simulate the area of a natural fingernail.

Second section 322 may form at least a portion of a bottom surface of artificial nail 30 adapted to be disposed on an upper surface of a natural nail of a wearer of artificial nail 30. Second section 322 may be generally of uniform thickness, for example 0.8 mm to 1.0 mm, but may decrease in thickness (i.e. taper) at second end 325 to facilitate attachment and blending with a natural nail. For example, second end 325 of second section 322 preferably tapers to a smaller thickness, for example 0.03 mm to 0.1 mm, at its proximal end to facilitate attachment and blending with a natural nail. Additionally, second end 325 of second section 322 may comprise a cuticle contact area 326 having a curved edge adapted to contact a cuticle portion of a natural nail.

Adjoining portions of first section 311 and second section 322 may form a stepped interface. The stepped interface between adjacent sections may comprise a number of substantially horizontal segments and a number of substantially vertical segments arranged at approximately right angles to one another. As shown in FIG. 3, stepped interface may comprise, for example, a two step interface.

An advantage of forming adjoining sections of an artificial nail as a stepped interface is that this structure provides enhanced mechanical strength to the artificial nail. The stepped interface provides a strong mechanical bond between adjacent sections of an artificial nail according to an embodiment of the invention and prevents the sections from separating from one another.

FIG. 4 shows an artificial nail comprising two sections according to another embodiment of the invention. As shown, artificial nail 40 may comprise a first section 411 formed by a runner system method as described for the embodiment shown in FIG. 3. As shown, projection or runner 421 is formed integral with the section of the artificial nail formed by a runner system method, for example first section 411. Projection or runner 421 must be removed in a separate processing step before the artificial nail can be used. Preferably, the artificial nail is sold with runner 421 on first section 411 so that runner 421 may be used by the wearer of artificial nail as a handle or applicator to facilitate application of the artificial nail to the wearer's natural nail. Runner 421 may also be provided with a number or other indicia providing size or other information regarding the associated nail. Following application of the artificial nail to the natural nail, the user can simply and easily remove runner 421 from the artificial nail.

After removal of the projection or runner 421, a vestige or protrusion may remain on a portion of the artificial nail section formed by a runner system method. This vestige may detract from or interfere with the fit of the artificial nail, particularly if the vestige is disposed on an edge of the artificial nail to be positioned adjacent a wearer's cuticle area. The vestige may also form an air pocket that prevents good sealing between the protrusion and an adjacent surface.

Accordingly, in a method according to an embodiment of the invention, a section of the artificial nail formed by a runner system method of injection molding preferably comprises a front distal tip of the artificial nail. A runner 421 used to form the front distal tip section of the artificial nail 40 is preferably arranged at an edge of the artificial nail which is not in contact with a wearer's cuticle area or the wearer's natural nail when the artificial nail is applied. In this way, a vestige resulting from forming a section of the artificial nail by a runner system method does not detract from or interfere with the fit of the artificial nail. Thus, a method according to an embodiment of the invention provides an artificial nail with an enhanced fit at the cuticle area, greater wearer comfort and a more natural looking appearance of the artificial nail. In addition, an air pocket which prevents good sealing between the artificial nail and a wearer's natural nail cannot form from the protrusion.

As shown in FIG. 4, artificial nail 40 may comprise at least one additional section, shown as second section 422. Second section 422 may be formed by a hot tip gate process, such as a micro hot tip gate process, using a hot manifold. For example, second section 422 may be formed by injecting a heated material from a heated nozzle into a cavity gate in the mold. Preferably, the gate is small, for example 0.0025 inches (0.0635 mm) in diameter as the section being formed is thin walled, for example 0.005 inches (0.127 mm) in thickness.

Use of a hot tip gate process for second section 422 provides flexibility in the formation of the section and better control over the placement of a vestige formed on the section. The hot tip gate process also eliminates the waste as no runner material is formed for the section formed by a hot tip gate process.

The hot tip gate process used to form second section 422 may employ a heated nozzle which feeds the material directly into the mold cavity, preferably at an angle generally upward and directed toward the proximal portion of the artificial nail to facilitate material flow into the mold. As shown, second section 422 has a first end 423 adjacent the front distal tip of the artificial nail 40 and a second end 425 distal the front tip of the artificial nail 40.

Gates 424 in the mold cavity used to inject the material or materials used to form second section 422 may be positioned at a portion of second section 422 other than second end 425. Preferably, the gates used to form the second section 422 of the artificial nail by a hot tip gate process is disposed in a region proximate the front distal tip section formed by a runner system method. Gate 424 may further be positioned at an edge or bottom surface of second section 422. Gate 424 should be at a location where the artificial nail will not be in contact with a wearer's natural nail to prevent an air pocket from forming where the vestige or protrusion from the gate is located. Preferably, gate 424 is located vertically beneath a portion of front distal tip section 411 so as to ensure that the protrusion will not be in contact with the wearer's natural nail and cannot cause an air pocket to prevent sealing between the natural nail and the artificial nail when the artificial nail is applied.

The hot tip gate injection molding process used to form second section 422 minimizes the gate vestige formed on the section. For example, the gate vestige may be 0.005 inches ((0.127 mm). This feature contributes to an enhanced fit at the cuticle area, greater wearer comfort and a more natural looking appearance for the artificial nail. In addition, as stated above, by locating the gate used to form second section 422 distal of where the section will be in contact with the wearer's natural nail, the possibility of an air pocket between the artificial nail and the wearer's natural nail caused by the gate vestige is eliminated.

The methods for forming, materials and appearance of the various sections of artificial nail 40 are similar to those described for the embodiment shown in FIG. 3. However, the interface between adjacent portions of first section 411 and second section 422 as shown in FIG. 4 comprises a single step interface.

The materials for the first and second sections 411 and 422 are preferably chosen so as to be compatible and bond with each other chemically so that the sections adhere together and the risk of separation between sections is minimized. The materials should also be chemically resistant to certain products, such as nail polish or adhesives used to apply the artificial nail to a wearer's natural nail. Preferably, first section 411 is formed to be rigid, but flexible. Preferably, first section 411 is white in color and made from pure acrylonitrile-butadiene-styrene (ABS). Second section 422 is preferably pink in color and made from a deformable material, for example TPU.

FIGS. 5 and 6 show additional embodiments of an artificial nail according to the invention, wherein the artificial nail is in the form of an extension or "tip" adapted to be placed on or near the end of a wearer's natural nail. In particular, FIG. 5 shows a artificial nail 50 in the form of a nail extension comprising three sections. FIG. 6 shows an artificial nail 60 in the form of a nail extension comprising two sections.

Artificial nail 50 and 60 may be formed by methods as described above for the embodiments shown in FIGS. 1 and 2 and FIGS. 3 and 4 respectively. Additionally, the materials and appearance of the various sections of artificial nails 50 and 60 are similar to those described for the embodiments described above.

As shown, a third section 533 of artificial nail 50, may comprise a back proximal part 550 adapted to be disposed on an upper surface of a natural nail and a front distal part 551 adapted to abut against an end of the natural nail. Similarly, a second section 622 of artificial nail 60 may comprise a back proximal part 650 adapted to be disposed on an upper surface of a natural nail and a front distal part 651 adapted to abut against an end of the natural nail.

Figure 7:
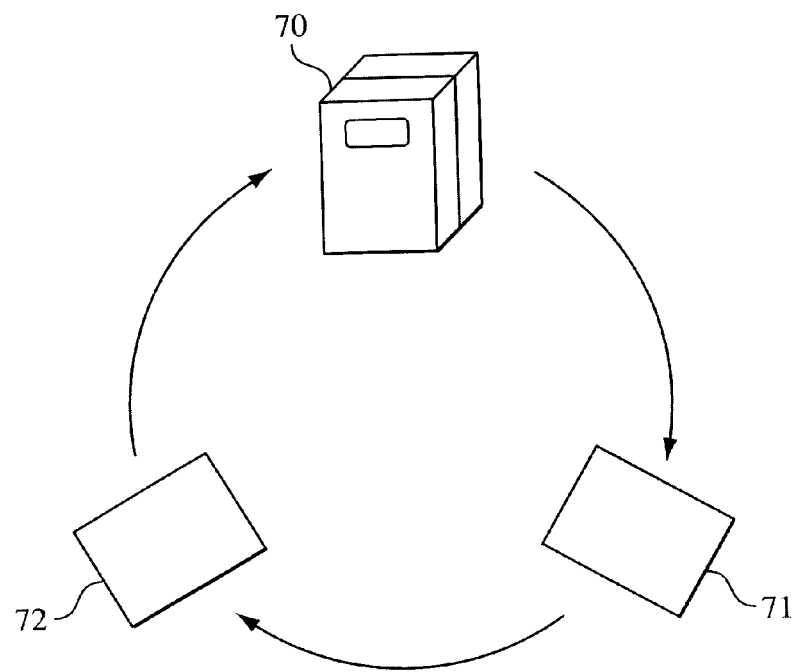
FIG. 7 is a schematic diagram of a process for forming an artificial nail according to the embodiments shown in FIGS. 3, 4 and 6.

FIG. 7 is a schematic diagram of a process for forming an artificial nail having two sections. As shown, a mold 70 is provided, for example a two-part mold. Mold 70 has one or more internal mold cavities defining the shape and dimensions of one or more artificial nails to be injection molded. In a first step 71, a first section of an artificial nail is formed by a runner system method of injection molding. For example, a first section of an artificial nail may be formed by injecting a quantity of heated material under pressure from a nozzle, into a sprue, through a runner and through a cavity gate or opening in mold 70 and into the mold cavity. In a second step 72, a second section of an artificial nail is formed using a hot tip gate process. For example, a second section of the artificial nail may be formed by injecting a quantity of heated material through a heated nozzle through a gate in mold 70 and directly into the mold cavity.

Figure 8:
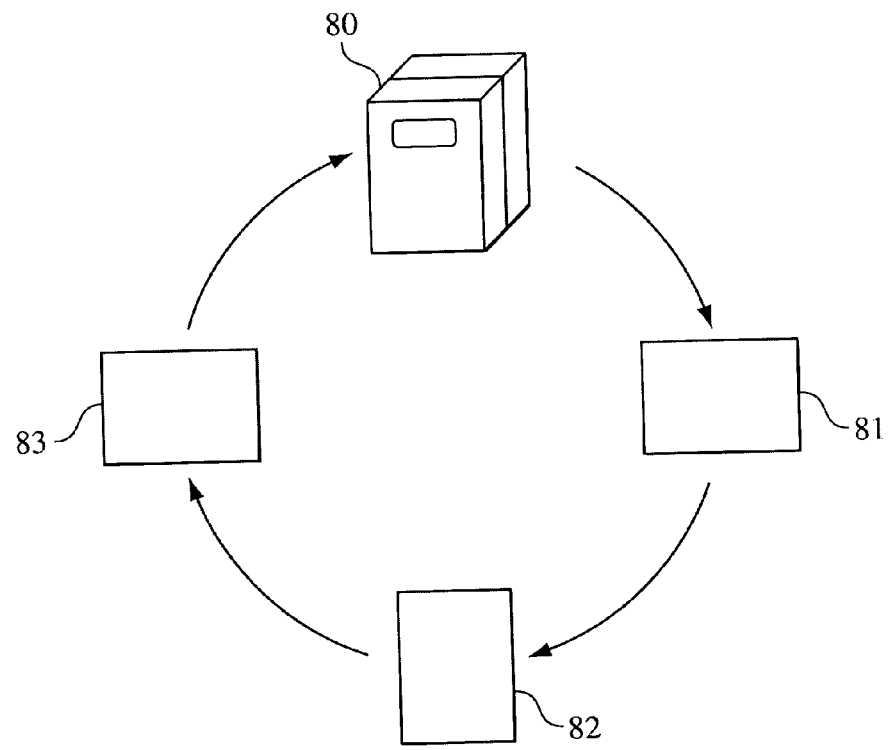
FIG. 8 is a schematic diagram of a process for forming an artificial nail according to the embodiments shown in FIGS. 1, 2 and 5.

FIG. 8 is a schematic diagram of a process for forming an artificial nail having three sections. As shown, a mold 80 is provided, for example a two-part mold. Mold 80 has one or more internal mold cavities defining the shape and dimensions of one or more artificial nails to be injection molded. In a first step 81, a first section of an artificial nail is formed by a runner system method of injection molding. For example, a first section of an artificial nail may be formed by injecting a quantity of heated material under pressure from a nozzle, into a sprue, through a runner and through a cavity gate or opening in mold 80 and into the mold cavity. In a second step 82, a second section of an artificial nail is formed using a hot tip gate process. For example, a second section of the artificial nail may be formed by injecting a quantity of heated material through a heated nozzle through a gate in mold 80 and directly into the mold cavity. In a third step 83, a third section of an artificial nail is formed using a hot tip gate process. For example, a third section of the artificial nail may be formed by injecting a quantity of heated material through a heated nozzle through a gate in mold 80 and directly into the mold cavity. Other sequences are also possible, for example one or more of the sections formed by a hot tip gate process may be formed prior to a section formed using a runner system method.

Figure 9:
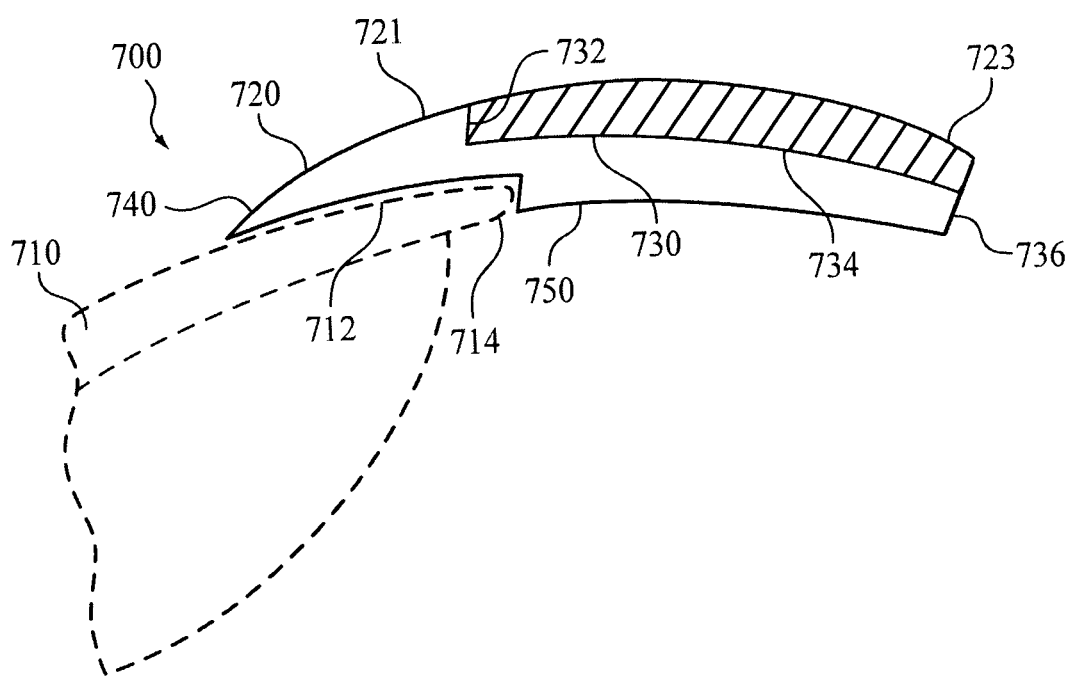
FIG. 9 is a side view of an artificial nail according to a seventh embodiment of the invention, shown as an extension to a wearer's natural nail.
Figure 10:
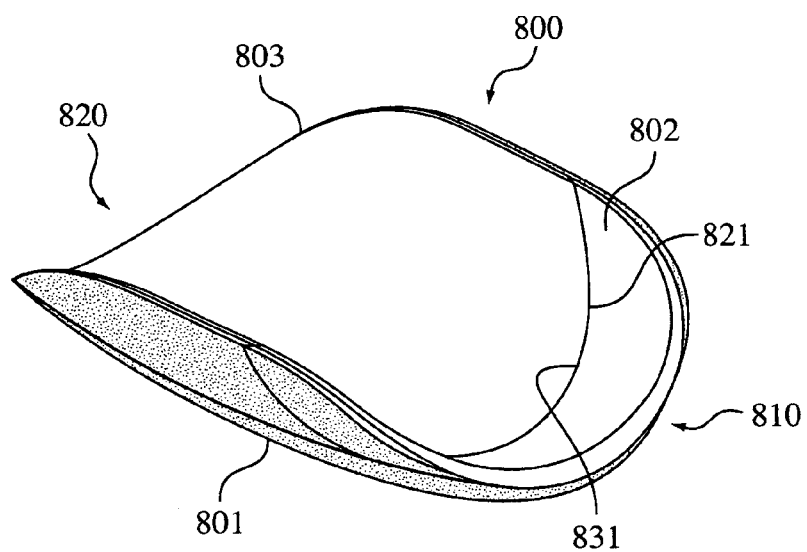
FIG. 10 is a bottom perspective view of an artificial nail according to an eighth embodiment of the invention.

FIG. 9 shows a seventh embodiment of an artificial nail in the form of an extension or "tip" adapted to be placed on or near the end of a wearer's natural nail for the appearance of longer nails. Artificial nail extension 700 includes a polymeric body 720 having first and second sections 721, 723. Polymeric body 720 has the general overall shape and configuration of the distal end of a natural fingernail or toenail. Polymeric body 720 may be made from the same materials as the polymeric bodies of the previous embodiments using a runner or hot tip method of injection molding.

First section 721 is made of a first translucent polymeric material which may be clear or tinted. Second section 723 is made of a second opaque polymeric material which is, for example, white or near white in appearance. The polymeric material for second section 723 may be the same or different as the polymeric material for first section 721.

First section 721 has a stepped upper surface defined by generally vertical edge 732 and generally horizontal edge 734 extending to the distal end 736 of first section 721. The stepped upper surface forms a receiving area in a portion of upper surface 730 into which second section 723 is disposed.

First section 721 has a back proximal part 740 adapted to be disposed on an upper surface 712 of a natural nail 710 and a front distal part 750 adapted to abut against an end 714 of natural nail 710.

Second section 723 is disposed above front distal part 750 and a portion of back proximal part 740 of first section 721.

FIGS. 10-14 show an artificial nail 800 comprising three sections 801, 802, 803 according to an embodiment of the invention. Artificial nail 800 is generally shaped to simulate the appearance of a natural nail.

Artificial nail 800 is formed by injection molding. A mold has a mold cavity that defines the dimensions and shape of artificial nail 800. A first section 801, a second section 802 and a third section 803 are formed so that a portion of each section is adjacent to a portion of each of the remaining sections.

In the figures, the respective sections are numbered for ease of reference only, and it is to be understood that the sections of an artificial nail according to an embodiment of the invention may be formed in any sequence or order.

In a preferred method, first section 801 is formed first and forms a top surface of the artificial nail 800 extending from a front distal tip 810 of the artificial nail 800 to a back proximal part 820 of the artificial nail 800. Artificial nail 800 is preferably sized so that at least a portion of first section 801 and second section 802 extend from a wearer's natural nail. First section 801 may be formed by a runner system method of injection molding. For example, first section 801 may be formed by injecting a quantity of heated material under pressure from a nozzle, into a sprue, through a runner and through a cavity gate or opening in a mold into a mold cavity.

Second section 802 may be formed after first section 801 and is disposed under first section 801. Second section 802 includes a second section end 821 distal the front distal tip 810 of artificial nail 800. Second section 802 extends from front distal tip 810 to the second section end 821.

Second section 802 may be formed by a runner system method of injection molding. For example, second section 802 may be formed by injecting a quantity of heated material under pressure from a nozzle, into a sprue, through a runner and through a cavity gate or opening in a mold into a mold cavity.

Figure 11:
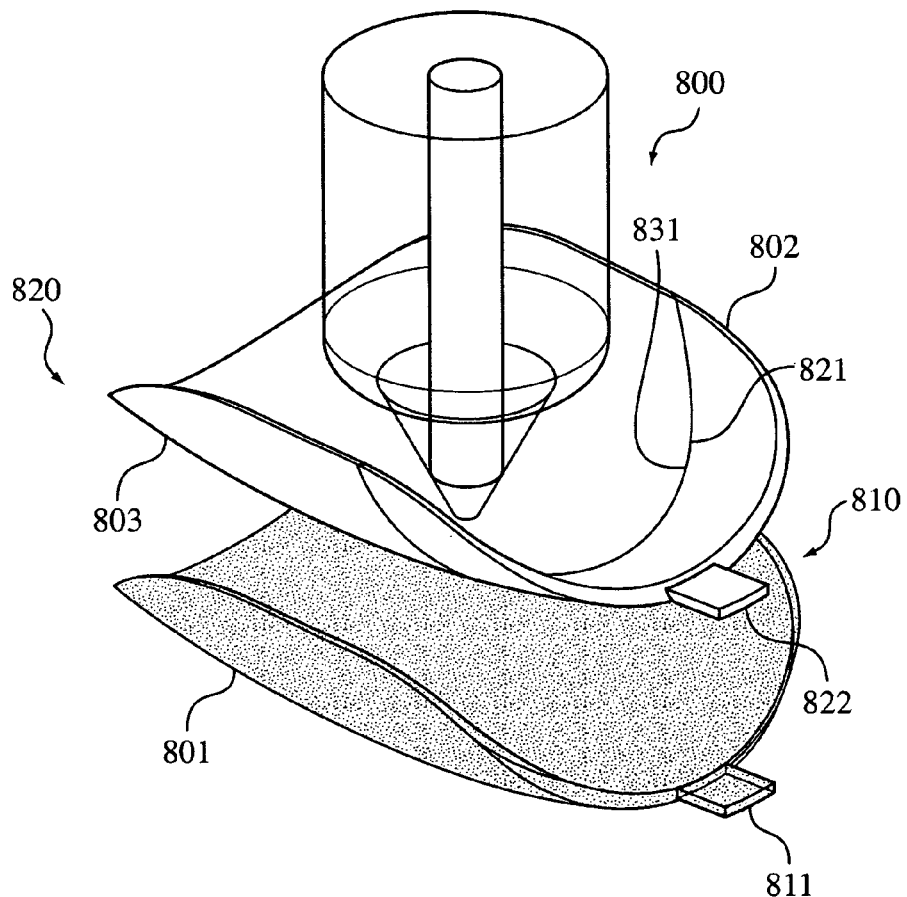
FIG. 11 is an exploded bottom perspective view of the artificial nail shown in FIG. 10.
Figure 12:
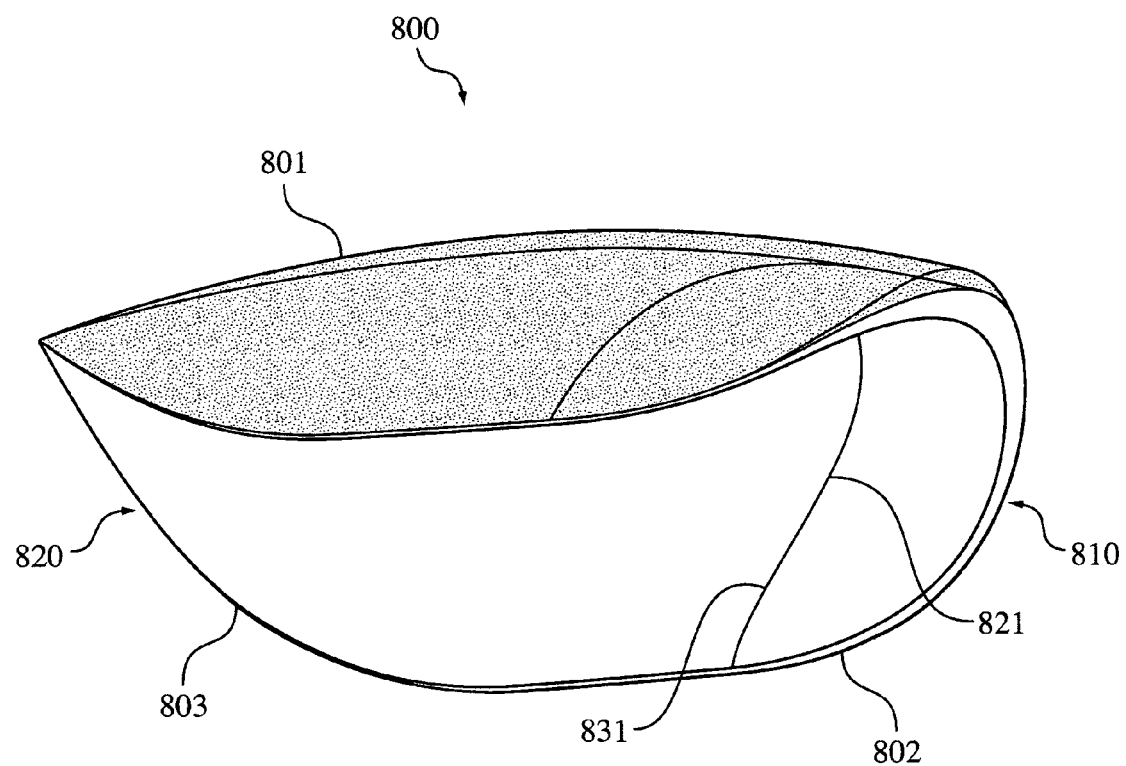
FIG. 12 is side-bottom perspective view of the artificial nail shown in FIG. 10.
Figure 13:
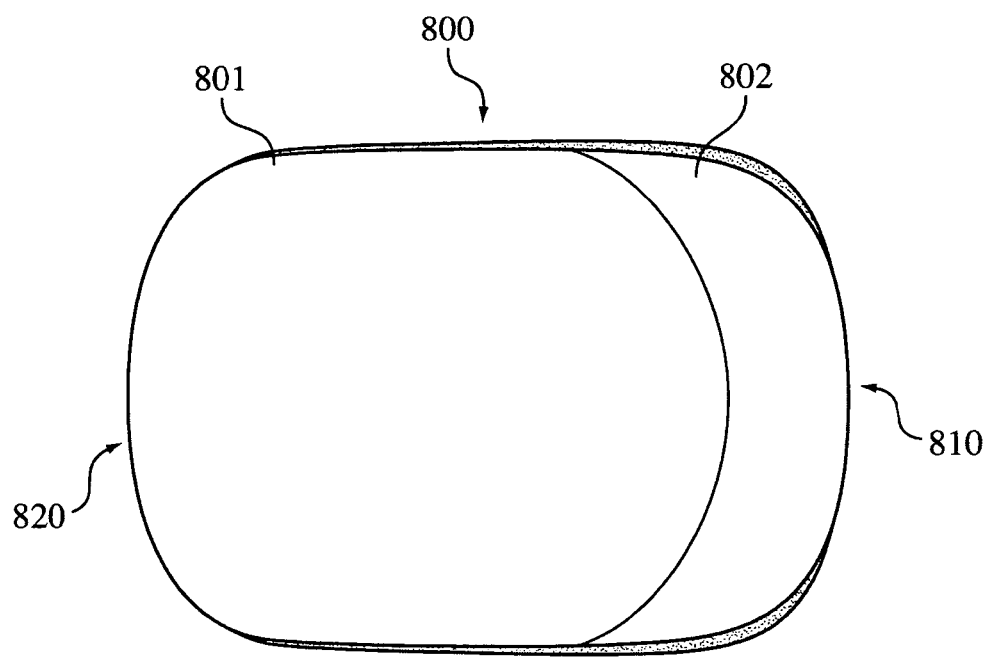
FIG. 13 is a top view of the artificial nail shown in FIG. 10.
Figure 14:
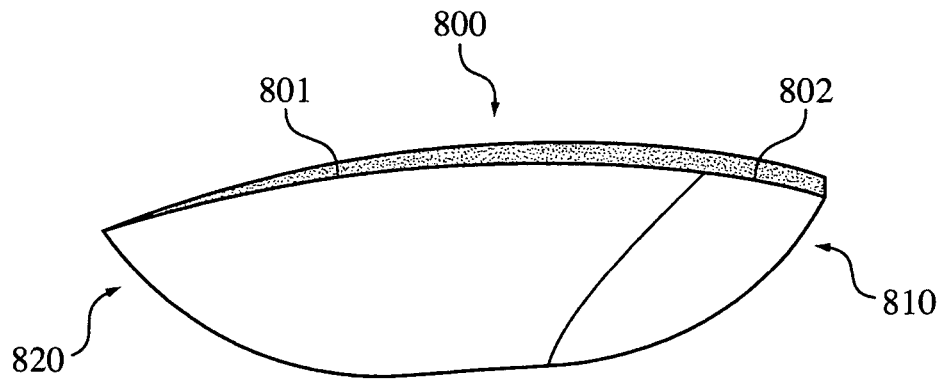
FIG. 14 is a side view of the artificial nail shown in FIG. 10.

As shown in FIG. 11, the runner system arrangement used to form first section 801 and second section 802 may result in the formation of a respective projection 811, 822 comprising solidified material formed in the channel connecting the cavity gate to the source of material used to form the respective artificial nail section. Projections 811, 822 may be formed, for example, in the runner connecting a sprue to a cavity gate through which the respective material used to form the first section 801 and second section 802 flows. Projections 811, 822 accordingly may have the shape and dimensions of the runner and may be referred to as a runner.

As shown, projection or runner 811, 822 is formed integral with the section of the artificial nail formed by a runner system method, for example first section 801 and/or second section 802. Projection or runner 811, 822 must be removed in a separate processing step before the artificial nail can be used.

Preferably, artificial nail 800 is sold with runner 811 and/or 822 on respective first section 801 or second section 802 so that the runner may be used by the wearer of artificial nail as a handle or applicator to facilitate application of the artificial nail to the wearer's natural nail. Runner 811, 822 may also be provided with a number or other indicia providing size or other information regarding the associated nail. Following application of the artificial nail to the natural nail, the user can simply and easily remove runner 811, 822 from the artificial nail.

After removal of the projection or runner 811, 822 a vestige or protrusion may remain on a portion of the artificial nail section or sections formed by a runner system method. This vestige may detract from or interfere with the fit of the artificial nail, particularly if the vestige is disposed on an edge of the artificial nail to be positioned adjacent a wearer's cuticle area. The vestige may also form an air pocket that prevents good sealing between the protrusion and an adjacent surface.

Accordingly, in a method according to an embodiment of the invention, the sections 801, 802 of the artificial nail 800 formed by a runner system method of injection molding preferably comprises a front distal tip of the artificial nail 800. A respective runner 811, 822 used to form the respective first section 801 and second section 802 of the artificial nail 800 are preferably arranged at an edge of the artificial nail 800 which is not in contact with a wearer's cuticle area or the wearer's natural nail when the artificial nail is applied. In particular, runners 811, 822 may be located at the front distal tip 810 of artificial nail 800. In this way, a vestige resulting from forming a section of the artificial nail by a runner system method does not detract from or interfere with the fit of the artificial nail. Thus, a method according to an embodiment of the invention provides an artificial nail with an enhanced fit at the cuticle area, greater wearer comfort and a more natural looking appearance. In addition, an air pocket which prevents good sealing between the artificial nail and a wearer's natural nail cannot form from the protrusion.

As described above, first section 801 and second section 802 may each be formed by a runner system method, for example by injecting a respective quantity of a respective heated material under pressure from a respective nozzle into a respective sprue, through a respective runner and thorough a respective cavity gate into respective mold cavity. The material used to form first section 801 may be a mixture of acrylonitrile-butadiene-styrene (ABS) plastic and a polycarbonate. Additionally, first section 801 may be formed from any plastic-like material commonly employed in the manufacture of artificial nails, such as ABS plastic, nylon, tenite acetate, vinyl acetate, polycarbonates, polyvinyl chloride, etc.

Preferably, first section 801 comprises a hard, polymeric body. Examples of suitable hard materials for first section 1 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UXS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

Second section 802 may comprise the same material as first section 801 or one or more different materials. Preferably, second section 802 is different in color from one or more remaining sections of the artificial nail 800, for example first section 801 and/or third section 803. In a preferred embodiment, second section 802 comprises an opaque white, off-white or near-white color, wherein one or more additional sections of the artificial nail comprise a contrasting or different color thereby providing the appearance of a "french tip" or french manicure.

Additionally, second section 802 preferably has a color which is substantially uniform through a thickness of the section. For example, second section 802 may be formed from a substantially homogenous material such that an appearance of second section 802 is substantially the same from a top surface to a bottom surface of the section. In this way, the appearance of a colored portion at the distal tip of the artificial nail will not be diminished by scratching, chipping, rubbing and/or peeling as is the case with existing artificial nails wherein color is applied as a thin layer disposed over the distal tip section.

Moreover, a method of forming an artificial nail having a second section 802 with a substantially uniform color through its thickness according to an embodiment of the invention eliminates the steps of coating the artificial nail section with a thin layer of nail polish or other colored solution to provide a "french tip". Thus, even if viewed from underneath or from the end and even if scratched, the front distal portion 810 of artificial nail 800 will appear to have one, preferably white, color to better simulate a french manicure.

As shown in FIGS. 10-14, artificial nail 800 comprises an additional third section 803. Third section 803 is formed by a hot tip gate process, such as a micro hot tip gate process, using a hot manifold. For example, third section 803 may be formed by injecting a heated material from a respective heated nozzle into a respective cavity gate in the mold. Preferably, the gates are small, for example 0.0025 inches (0.0635 mm) in diameter, as the sections being formed are thin walled, for example 0.005 inches (0.127 mm) in thickness.

Use of a hot tip gate process to form third section 803 allows the direct gating on the section, which provides flexibility in the formation of this section of the artificial nail and better control over the placement of the vestige formed on the third section 803. The hot tip gate process also eliminates the waste as no runner material is formed for this section.

Third section 803 is disposed under first section 801 and includes a third section end 831 adjoining the second section end 821 of second section 802. Third section 803 extends from the back proximal end 820 of artificial nail 800 to the third section end 831 of third section 803.

As set forth above, first section 801 forms a top surface of artificial nail 800 and extends form the front distal tip 810 to the back proximal part 820 of the artificial nail 800. In particular, first section 801 completely covers second section 802 and third section 803. Thus first section 801 may replace and eliminate the need for UV coating of the artificial nail. This feature of artificial nail 800 provides a significant advantage in that the elimination of the UV coating process can provide lower production costs. Moreover, the potentially hazardous materials and fumes associated with the UV coating process are avoided. In particular, the properties and functions which the UV coated layer is designed to provide may be provided in this embodiment, for example, by a clear, scratch-resistant injection molded layer 801 covering substantially an entire top portion of artificial nail 800.

First section 801 may be translucent, transparent, or opaque. The term "translucent" is meant to include both transparent or clear materials and tinted materials that permit materials disposed underneath to be visible there through. Preferably, first section 801 is translucent or transparent so that the second section 801 and third section 803 are visible through first section 801.

The hot tip gate process used to form third section 803 may employ a heated nozzle which feeds the material directly into the mold cavity. Preferably, the gate used to form the third section 803 of the artificial nail 800 by a hot tip gate process are disposed in a region distal the back proximal end 820 of the artificial nail 800.

The hot tip gate injection molding process used to form third section 803 minimizes the gate vestige formed on this section. For example, the gate vestige may be 0.005 inches (0.127 mm). This feature contributes to an enhanced fit at the cuticle area, greater wearer comfort and a more natural looking appearance for the artificial nail.

The materials used to form third section 803 using a hot tip gate process may be the same or a different material form the material or materials used to form first section 801 and second section 802 using a runner system method of injection molding.

As described above, the respective sections of an artificial nail according to the invention may be formed in any order and the section numbers used herein are for ease of reference only. In a preferred embodiment, first section 801 is formed first using a runner system method, followed sequentially by second section 802 formed using a runner system method and third section 803, formed using a hot tip gate process.

Third section 803 may form at least a portion of a bottom surface of artificial nail 800 adapted to be disposed on an upper surface of a natural nail of a wearer of artificial nail 800. Third section 803 may be generally of uniform thickness, for example 0.8 mm to 1.0 mm, but may decrease in thickness (i.e. taper) to facilitate attachment and blending with a natural nail and to conform to the contour of second section 2.

The material used to form third section 803 may be a mixture of acrylonitrile-butadiene-styrene (ABS) plastic and a polycarbonate. Additionally, third section 803 may be formed from any plastic-like material commonly employed in the manufacture of artificial nails, such as ABS plastic, nylon, tenite acetate, vinyl acetate, polycarbonates, polyvinyl chloride, etc.

Third section 803 may comprise a hard, polymeric body. Examples of suitable hard materials for third section 803 are Styrolux® 684D (SBC), a styrene-butadiene block copolymer available from BASF Corporation; Cyro® R40 (acrylic base), an acrylic-based multipolymer available from Cyro Industries of Rockaway, N.J.; Lexane KR01(PC)(trade name), a polycarbonate available from GE Plastics; K-resin® (SBC), a styrene-butadiene copolymer available from Chevron Phillips Chemical Company; TP-UXS(MMBS)(trade name), a methyl methacrylate butadiene styrene terpolymer available from DENKA of Tokyo, Japan; Starex® 5010(ABS), an acrylonitrile butadiene styrene available from Samsung Cheil Industries; Zylar® 220(SMMC) and Nas® 30, styrene methyl methacrylate copolymers available from Nova Chemicals; and Toyalac 920 (clear ABS), an acrylonitrile butadiene styrene available from Toray Resin Company.

Preferably, however, third section 803 is formed from a soft or deformable material. An advantage of forming third section 803 from a deformable material is that each artificial nail will conform more closely to the user's natural nail when applied thereto. A further advantage of forming third section 803 from a deformable material is that first section 801 and/or second section 802 may be made from a wide variety of hard substances while also enabling the artificial fingernail to be easily removable by conventional acetone removers. Because the third section 803 comprises a deformable layer that contacts the wearer's nail, materials that do not readily dissolve in acetone may be used for the first and second sections without sacrificing ease of removability.

For example, after selecting an appropriately sized artificial nail 800, the user may apply a selected conventional adhesive, such as an ethylcyanoacrylate-based glue, to the natural nail. Artificial nail 800 is then placed on the natural nail so as to cover substantially all or a portion of the upper nail surface. Pressure is applied by pressing down on artificial nail 800. Such pressure causes third section 803 to compress and conform to the contour of the upper surface of the wearer's natural nail, thereby providing a better fit. If desired, once applied, artificial nail 800 may be trimmed and shaped using a nail file.

Exemplary deformable materials used to form third section 803 are thermoplastic elastomers (TPE), thermoplastic polyurethanes (TPU) or mixtures thereof, preferably silicone, silicone derivatives, rubbers, or other materials which will deform under pressure to conform to the contour of a wearer's natural nail. For example, material suitable for forming soft contact lenses such as silicone elastomers, silicone-containing macromers, hydrogels, silicone-containing hydrogels, siloxanes, siloxane macromers, and mixtures thereof may be used to form third section 803.

Examples of suitable soft or deformable materials are Versaflex® OM9-802CL, a thermoplastic elastomer alloy available from GLS Corporation of Arlington Heights, Ill.; TPE40ANS200 (trade name), a thermoplastic elastomer alloy available from Advanced Elastomer Systems; Elastollan® TPU, a thermoplastic polyurethane elastomer available from BASF Corporation; Estane TPU (trade name), a thermoplastic polyurethane elastomer available from Noveon, Inc.; and Engage 8407 TPU, a polyolefin elastomer available from Du Pont Dow Elastomers of Wilmington, Del.

The materials for the first, second and third sections 801, 802 and 803 are preferably chosen so as to be compatible and bond with each other chemically so that the sections adhere together and the risk of separation between sections is minimized. The materials should also be chemically resistant to certain products, such as nail polish or adhesives used to apply the artificial nail to a wearer's natural nail. Preferably, first and second sections 801, 8022 are formed to be rigid, but flexible. Preferably, second section 802 is white in color and made from pure acrylonitrile-butadiene-styrene (ABS). Section 803 is preferably deformable.

In a preferred embodiment, third section 803 may be adapted to conform to a cuticle portion of the wearer's nail and remain deformable when the artificial nail 800 is worn by the wearer. Third section 803 may be translucent, transparent, or opaque.

Accordingly, while a number of embodiments of the present invention have been shown and described, it is obvious that many changes and modifications may be made thereunto without departing from the spirit and scope of the invention.

What is claimed is:

1. A method for forming an artificial nail by injection molding, the method comprising the steps of:
   a) forming a first section using a runner system method;
   b) forming a second section using a runner system method, the second section being disposed under the first section and comprising a second section end; and
   c) forming a third section using a hot tip gate process, the third section being disposed under the first section and comprising a third section end adjoining the second section end;
   wherein the first section forms a top surface of the artificial nail extending from a front distal tip of the artificial nail to a back proximal end of the artificial nail and the first section completely covers the second section and the third section;
   wherein the second section end is distal the front distal tip of the artificial nail and the second section extends from the front distal tip of the artificial nail to the second section end; and
   wherein the third section extends from the back proximal end of the artificial nail to the third section end.

2. The method according to claim 1, wherein the first section comprises a hard polymeric body.

3. The method according to claim 1, wherein the third section comprises a deformable material.

4. The method according to claim 1, wherein the third section is adapted to be disposed on an upper surface of a natural nail of a wearer.

5. The method according to claim 1, wherein the second section comprises an opaque material.

6. A method for forming an artificial nail by injection molding, the method comprising the steps of:
   a) forming a first section by injecting a first quantity of heated material under pressure from a first nozzle into a first sprue, through a first runner and through a first cavity gate into a first mold cavity;
   b) forming a second section by injecting a second quantity of heated material under pressure from a second nozzle into a second sprue, through a second runner and through a second cavity gate into a second mold cavity, the second section being disposed under the first section and comprising a second section end;

c) forming a third section by injecting a third quantity of heated material under pressure from a heated nozzle through a third cavity gate into a third mold cavity, the third section being disposed under the first section and comprising a third section end adjoining the second section end;

wherein the first section forms a top surface of the artificial nail extending from a front distal tip of the artificial nail to a back proximal end of the artificial nail and the first section completely covers the second section and the third section;

wherein the second section end is distal the front distal tip of the artificial nail and the second section extends from the front distal tip of the artificial nail to the second section end; and wherein the third section extends from the back proximal end of the artificial nail to the third section end.

7. The method according to claim 6, wherein the first section comprises a hard polymeric body.

8. The method according to claim 6, wherein the third section comprises a deformable material.

9. The method according to claim 6, wherein the third section is adapted to be disposed on an upper surface of a natural nail of a wearer.

10. The method according to claim 6, wherein the second section comprises an opaque material.

11. An injection molded artificial nail comprising:
a) a first section formed using a runner system method;
b) a second section formed using a runner system method, the second section being disposed under the first section and comprising a second section end; and
c) a third section formed using a hot tip gate process, the third section being disposed under the first section and comprising a third section end adjoining the second section end;

wherein the first section forms a top surface of the artificial nail extending from a front distal tip of the artificial nail to a back proximal end of the artificial nail and the first section completely covers the second section and the third section;

wherein the second section end is distal the front distal tip of the artificial nail and the second section extends from the front distal tip of the artificial nail to the second section end; and wherein the third section extends from the back proximal end of the artificial nail to the third section end.

12. The injection molded artificial nail according to claim 11, wherein the first section comprises a hard polymeric body.

13. The injection molded artificial nail according to claim 11, wherein the third section comprises a deformable material.

14. The injection molded artificial nail according to claim 11, wherein the third section is adapted to be disposed on an upper surface of a natural nail of a wearer.

15. The injection molded artificial nail according to claim 1, wherein the second section comprises an opaque material.

* * * * *